United States Patent
Vachharajani et al.

(10) Patent No.: US 10,044,624 B2
(45) Date of Patent: Aug. 7, 2018

(54) NETWORK TRAFFIC MANAGEMENT USING STREAM-SPECIFIC QOS BITS

(71) Applicant: F5 Networks, Inc., Seattle, WA (US)

(72) Inventors: Manish Vachharajani, Lafayette, CO (US); John Giacomoni, Longmont, CO (US); Mark Terrel, Denver, CO (US); Leonard Maiorani, Denver, CO (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/970,433

(22) Filed: Aug. 19, 2013

(65) Prior Publication Data

US 2014/0056144 A1    Feb. 27, 2014

Related U.S. Application Data

(60) Provisional application No. 61/684,647, filed on Aug. 17, 2012.

(51) Int. Cl.
| | |
|---|---|
| *H04L 12/851* | (2013.01) |
| *H04L 12/26* | (2006.01) |
| *H04L 12/801* | (2013.01) |
| *H04L 12/841* | (2013.01) |

(52) U.S. Cl.
CPC .............. *H04L 47/24* (2013.01); *H04L 43/08* (2013.01); *H04L 47/2408* (2013.01); *H04L 47/28* (2013.01); *H04L 47/33* (2013.01)

(58) Field of Classification Search
None
See application file for complete search history.

(56) References Cited

U.S. PATENT DOCUMENTS

| | | | |
|---|---|---|---|
| 7,970,863 B1* | 6/2011 | Fontaine | 709/218 |
| 2006/0149845 A1* | 7/2006 | Malin et al. | 709/228 |
| 2008/0033845 A1* | 2/2008 | McBride et al. | 705/28 |
| 2008/0144502 A1* | 6/2008 | Jackowski et al. | 370/235 |

* cited by examiner

*Primary Examiner* — Huy D Vu
*Assistant Examiner* — Hong Shao
(74) *Attorney, Agent, or Firm* — Holland & Hart LLP

(57) ABSTRACT

Methods, systems, and devices are described for managing network communications. A traffic manager module configured to serve as a proxy between a plurality of client devices and a network service may receive a plurality of messages for the network service. Each message may be associated with at least one QoS parameter. The traffic manager module may transmit the plurality of messages to the network service over a connection between the traffic manager module and the network service. The QoS of the connection between the traffic manager module and the network service may be dynamically altered during the transmission of a first message of the plurality of messages based on the at least one QoS parameter associated with the first message.

20 Claims, 23 Drawing Sheets

ABSTRACT# NETWORK TRAFFIC MANAGEMENT USING STREAM-SPECIFIC QOS BITS

CROSS-REFERENCE TO RELATED APPLICATION

The present application claims priority to U.S. Provisional Application No. 61/684,647, entitled "NETWORK TRAFFIC MANAGER ARCHITECTURE," filed Aug. 17, 2012, the entire disclosure of which is incorporated herein by reference for all purposes.

BACKGROUND

The present invention relates to network traffic management, and more particularly, to the controlled optimization of network traffic using a proxy network traffic manager module.

Many computer network systems rely on the use of optimization services serially integrated into a network path to streamline the flow of data, provide efficient use of network resources, or improve quality of service. For example, this type of architecture is often found in cellular networks. With the ever increasing demand for streaming data, many networks have integrated optimizer services into their network paths. These optimizer services may pre-process content requested by client devices to adapt the content to the capabilities of the requesting devices and conserve network bandwidth. The processed content is then streamed to the requesting device.

Optimizer services and other performance enhancing services are typically placed in-line with a network path, and often end up processing all network traffic, regardless of whether the function of the service is applicable to the traffic.

SUMMARY

Methods, systems, and devices are described for increasing the efficiency and scalability of performance enhancement functionality in a network.

According to a first set of illustrative embodiments, a method of managing network communications may include receiving, at a traffic manager module configured to serve as a proxy between a plurality of client devices and a network service, a plurality of messages for the network service, each message associated with at least one QoS parameter; transmitting the plurality of messages to the network service over a connection between the traffic manager module and the network service; and dynamically altering a QoS of the connection between the traffic manager module and the network service during the transmission of a first message of the plurality of messages based on the at least one QoS parameter associated with the first message.

In certain examples, the traffic manager module may receive a first set of one or more packets from one of the plurality of client devices, the first set of one or more packets including the first message. The traffic manager module may determine, from the first set of one or more packets, the at least one QoS parameter associated with the first message.

In certain examples, the traffic manager module may create a second set of one or more packets at the traffic manager module, the second set of one or more packets including the first message. Dynamically altering the QoS of the connection between the traffic manager module and the network service may include setting at least one Type of Service (ToS) parameter of the second set of one or more packets based on the at least one QoS parameter associated with the first message and transmitting the second set of one or more packets to the network service over the connection between the traffic manager module and the network service.

In certain examples, the at least one QoS parameter associated with the first message may be determined based on a plurality of differentiated services codepoint (DSCP) bits of the first set of one or more packets; the setting the at least one ToS parameter of the second set of one or more packets may include matching a plurality of DSCP bits of the second set of one or more packets to the plurality of DSCP bits of the first set of one or more packets.

In certain examples, the traffic manager module may receive a third set of one or more packets including a response from the network service to the first message and determine, from the third set of one or more packets, at least one QoS parameter associated with the response from the network service to the first message. The traffic manager module may create a fourth set of one or more packets at the traffic manager module, the fourth set of one or more packets including the response from the network service to the first message.

In certain examples, the at least one ToS parameter of the fourth set of one or more packets may be set based on the at least one QoS parameter associated with the response from the network service to the first message. The traffic manager module may transmit the fourth set of one or more packets to the network service over the connection between the traffic manager module and the network service.

In certain examples, the at least one QoS parameter associated with the response from the network service to the first message may be determined based on a plurality of DSCP bits of the third set of one or more packets; and the setting the at least one ToS parameter of the fourth set of one or more packets may include matching a plurality of DSCP bits of the fourth set of one or more packets to the plurality of DSCP bits of the third set of one or more packets.

According to a second set of illustrative embodiments, a traffic manager module may include at least one processor and a memory communicably coupled with the at least one processor. The memory may be configured to store code that, when executed by the at least one processor, causes the at least one processor to receive a plurality of messages for the network service, each message associated with at least one QoS parameter, wherein the traffic manager module serves as a proxy between a plurality of client devices and the network service; transmit the plurality of messages to the network service over a connection between the traffic manager module and the network service; and dynamically alter a QoS of the connection between the traffic manager module and the network service during the transmission of a first message of the plurality of messages based on the at least one QoS parameter associated with the first message.

In certain examples, the code may cause the at least one processor to implement one or more aspects of the method described above with respect to the first set of illustrative embodiments.

According to a third set of illustrative embodiments, a computer program product may include a tangible computer-readable medium comprising computer-readable program code stored thereon. The computer-readable program code may be configured to cause at least one processor to receive, at a traffic manager module configured to serve as a proxy between a plurality of client devices and a network service, a plurality of messages for the network service, each message associated with at least one QoS parameter; transmit the plurality of messages to the network service over a connection between the traffic manager module and the network service; and dynamically alter a QoS of the connection between the traffic manager module and the network service during the transmission of a first message of the plurality of messages based on the at least one QoS parameter associated with the first message.

In certain examples, the computer-readable program code may be configured to cause the at least one processor to implement one or more aspects of the method described above with respect to the first set of illustrative embodiments.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Methods, systems, and devices are described for managing network communications. A traffic manager module configured to serve as a proxy between a plurality of client devices and a network service may receive a plurality of messages for the network service. Each message may be associated with at least one QoS parameter. The traffic manager module may transmit the plurality of messages to the network service over a connection between the traffic manager module and the network service. The QoS of the connection between the traffic manager module and the network service may be dynamically altered during the transmission of a first message of the plurality of messages based on the at least one QoS parameter associated with the first message.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
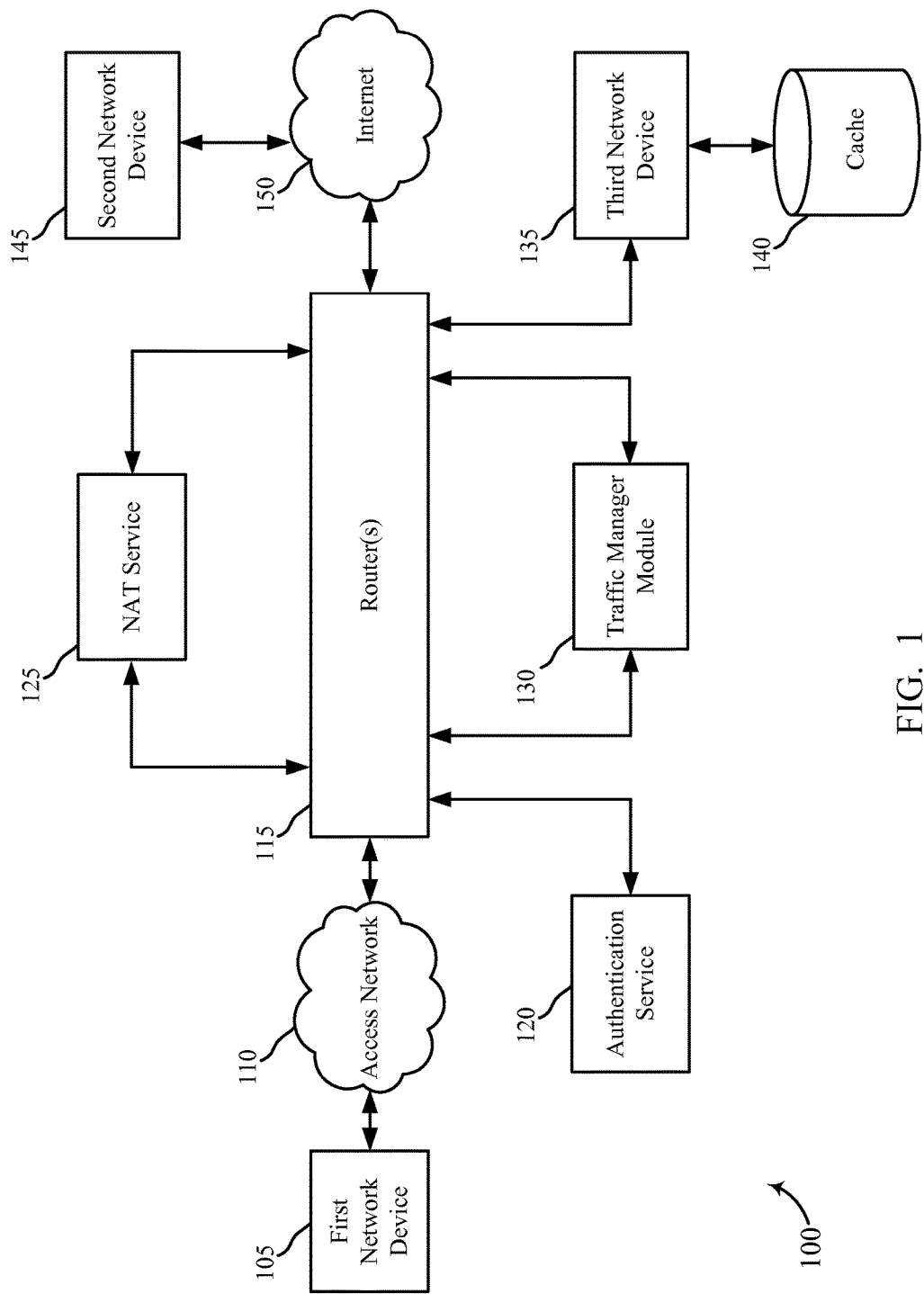
FIG. 1 is a block diagram of an example network incorporating a traffic manager module according to various embodiments of the invention.

FIG. 1 is a block diagram of an example system 100 incorporating a traffic manager module 130 that operates as a proxy to enhance network performance. The system 100 of the present example may include a first network device 105, an access network 110, one or more network routers 115, an authentication service 120, a Network Address Translation (NAT) service, the traffic manager module 130, a third network device 135, a cache 140, and a connection to the Internet 150 and/or another packet data network. Each of these components may be in communication with the other components, directly or indirectly.

In certain examples, the first network device 105 may be a mobile device and the access network 110 may be a radio access network, but the principles of the present description are not limited to such embodiments. Those having skill in the art will recognize that other types of devices and networks may be used. Similarly, the inventive principles of the present description are not limited to systems including an authentication service 120 or a NAT service 125. Rather, additional or alternate services or network devices may be used as may suit a particular application of the principles described herein. In certain examples, one or more of the authentication service 120, the NAT service 125, the third network device 135, or other services or network devices may be subsumed into the traffic manager module 130.

In the present example, a first network device 105 attempting to access the Internet or another packet data network may not be granted access to the network until an authentication service 120 confirms that an account or user associated with the first network device 105 is authorized to access the network. In certain examples, this authorization may be based on an identity of the first network device 105. Additionally or alternatively, the authorization may be based on one or more authentication credentials provided by the first network device 105. Once the authentication service 120 has authenticated the first network device 105, the first network device 105 may be permitted to request network objects (e.g., files, web pages, etc.) from the second network device 145 or access other services over the network. The router(s) 115 may be configured such that certain requests from the first network device 105 received over the access network 110 may be sent to the traffic manager module 130 and other types of requests may be sent to the NAT service 125. For example, the router(s) 115 may be configured to direct all requests from the first network device 105 that are associated with Transport Control Protocol (TCP) port 80 to the traffic manager module 130. Other requests may be routed directly to the NAT service 125 for resolution and further routing to the appropriate service or network device.

It will be understood that the authentication service 120 of the present example may at any time insert or update the credentials and policies associated with a user. Additionally or alternatively, the traffic manager module 130 may request updated credentials and policies from the authentication service 120 at any time.

The traffic manager module 130 may be configured to act as a proxy with respect to certain messages issued by the first network device 105. Thus, the traffic manager module 130 may establish one or more connections (e.g., TCP sessions) with the first network device 105, and one or more connections with the second network device 145 and/or the third network device 135 on behalf of the first network device 105. In certain examples, the traffic manager module 130 may be implemented by hardware executing special-purpose code. Alternatively, the traffic manager module 130 may be implemented entirely by hardware.

By acting as a proxy, the traffic manager module 130 may optimize the processing of messages from the first network device 105 requesting network objects and responses to those messages from second network device 145 and/or the third network device 135. Thus, the traffic manager module 130 may, for example, receive incoming TCP or other layer 4 packets related to a message from the first network device 105 requesting an object or a response to such a request from an external service implemented by, for example, the second network device 145 or the third network device 135. The traffic manager module 130 may analyze the application layer (layer 7) content of these received packets. The traffic manager module 130 may then take certain actions with respect to one or more connections based on the analysis of the application layer content and a set of rules enforced by the traffic manager module 130. Examples of such actions that may be taken by the traffic manager module 130 include but are not limited to: 1) forwarding at least a portion of a message from the first network device 105 or a response to the message to the third network device 135 based on the application layer content of one or more packets associated with the message or the response to the message, 2) terminating a message from the first network device causing the first network device to reissue the message to the third network device 135 based on the application layer content of one or more packets associated with the message or the response to the message, and 3) splicing data from a first connection to another connection based on the application layer content of one or packets associated with the message or the response to the message.

The actions taken by the traffic manager module 130 with respect to individual connections may speed up or otherwise optimize the processing and handling of requests from the first network device 105. As one example of how this optimization may be implemented, consider the case of content optimization. The third network device 135 may implement a content optimizer service that reformats, re-encodes, or otherwise converts files or other objects requested by the first network device 105 into a format that is appropriate for the bandwidth and form factor constraints of the first network device 105. For example, the third network device 135 may implement a video optimizer service that converts video files requested by the first network device 105-*a* to a smaller format for transmission to the first network device 105 based on the screen size and bandwidth constraints of the first network device 105.

In some systems, a content optimizer services is placed serially in a network such that all files transmitted to the first network device 105 pass through the content optimizer service 135, regardless of whether the files are relevant to the content optimizer service. For example, a mobile network may pass all HTTP messages to or from an internet server through a video optimizer service, regardless of whether those files are videos capable of being optimized by the service. Such configurations may increase network overhead and be difficult and expensive to scale.

By contrast, the present system 100 may use the traffic manager module 130 to optimize requests for certain types of files and responses to those requests by acting as a proxy for the first network device 105. The traffic manager module 130 may inspect the application layer content of packets directed to and from the first network device 105. If the traffic manager module 130 identifies a message from the first network device 105 that requests a certain type of file (e.g., a video file) from the second network device 145 over the Internet 150, the traffic manager module 130 may forward at least a portion of the message to the third network device 135, which may be configured to optimize files of the identified type. If the file is already stored at the cache 140 in a format suitable for the first network device 105, the third network device 135 may stream the file to the first network device 105 from the cache 140. If the requested file is stored at the cache 140 in a format that is not suitable for the first network device 105, the third network device 135 may reformat the stored file and stream it to the first network device 105. If the requested file is not stored at the cache 140, the third network device 135 may request the file over the Internet 150 from the second network device 145 or another source specified by the first network device 105 in the original request. The third network device 135 may reformat the received file as appropriate and stream the reformatted file to the first network device 105.

In additional or alternative examples, the traffic manager module 130 may perform application layer inspection on one or more packets received on a proxy connection as a response to a message containing a request made on behalf of the first network device 105. The traffic manager module 130 may determine that the inspected packets are related to a certain type of file (e.g., video) and forward the packets to the third network device 135 for reformatting or other optimization prior to transmitting the file to the first network device 105. In certain examples, the third network device 135 may determine that the file is already stored at the cache 140, cancel the proxy connection providing the file, and stream the video file directly to the first network device 105 from the cache 140.

Thus, through the use of message inspection at the application layer, the traffic manager module 130 may forward certain types of messages or responses to the third network device 135, and connections associated with the transmittal of other types of files or information may bypass the third network device 135 altogether, thereby reducing congestion at the third network device 135 and increasing overall throughput in the system 100. The message inspection may include application layer inspection. One example of application layer inspection may include deep packet inspection.

In certain examples, the traffic manager module 130 may include additional features for increasing the speed or reliability of one or more connections maintained with the second network device 145 on behalf of the first network device 105. For example, the traffic manager module 130 may be configured to demote application layer (layer 7) connections to transport layer (layer 4) connections based on global settings, per-subscriber settings, or other input at the traffic manager module 130. In one example, the traffic manager module 130 may receive an application layer connection on TCP port 80 and, based on the content of one or more packets associated with the connection, determine that the connection is not a hypertext transport protocol (HTTP) connection. The connection may therefore be demoted to a transport layer connection.

Figure 2A:
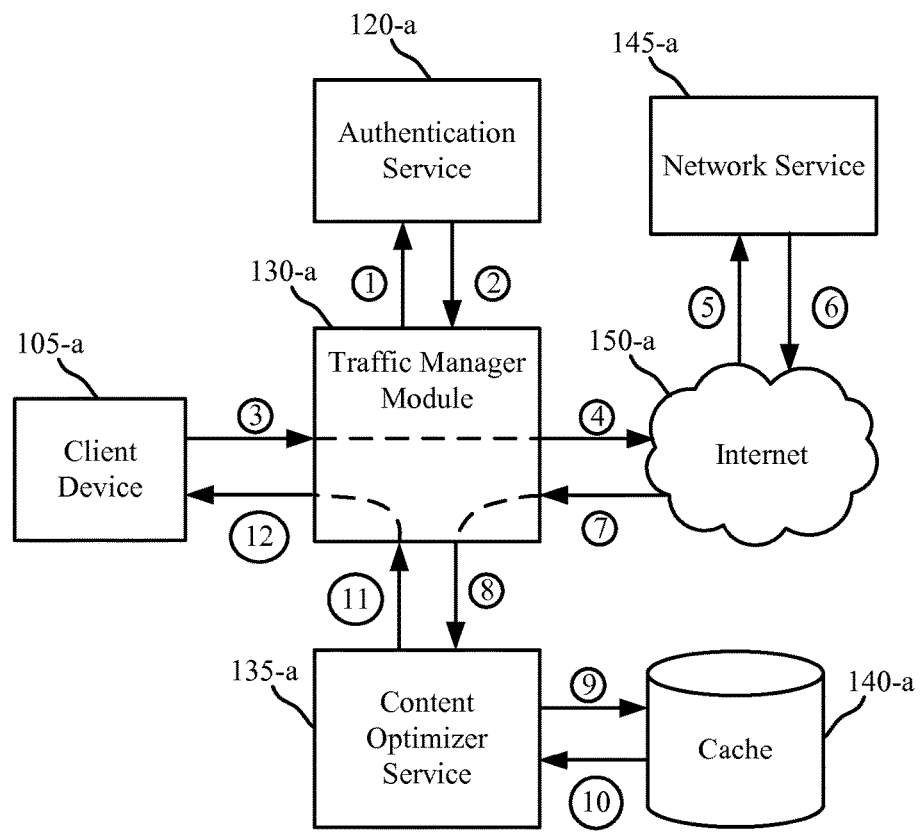
FIGS. 2A-2C are block diagrams of example traffic management operations in a traffic manager module of a network according to various embodiments of the invention.
Figure 2B:
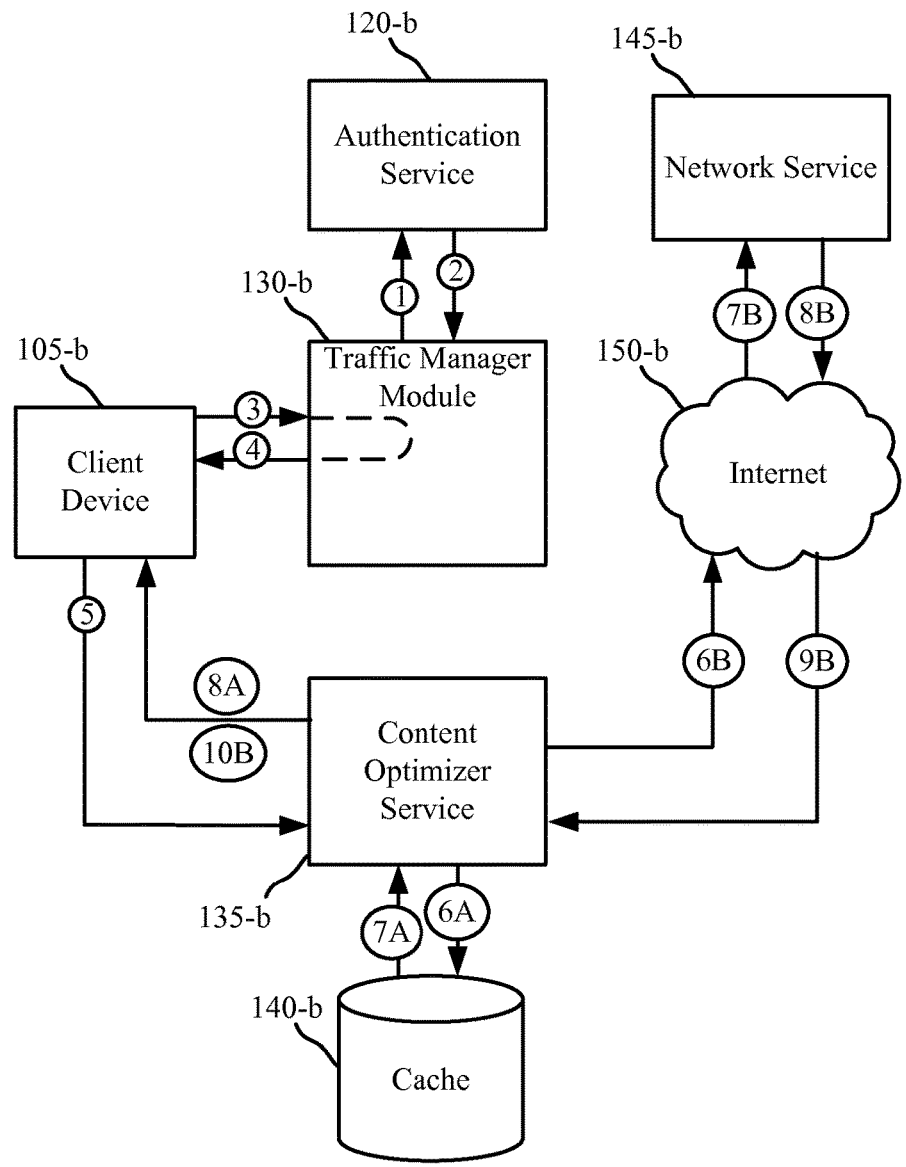
Figure 2C:
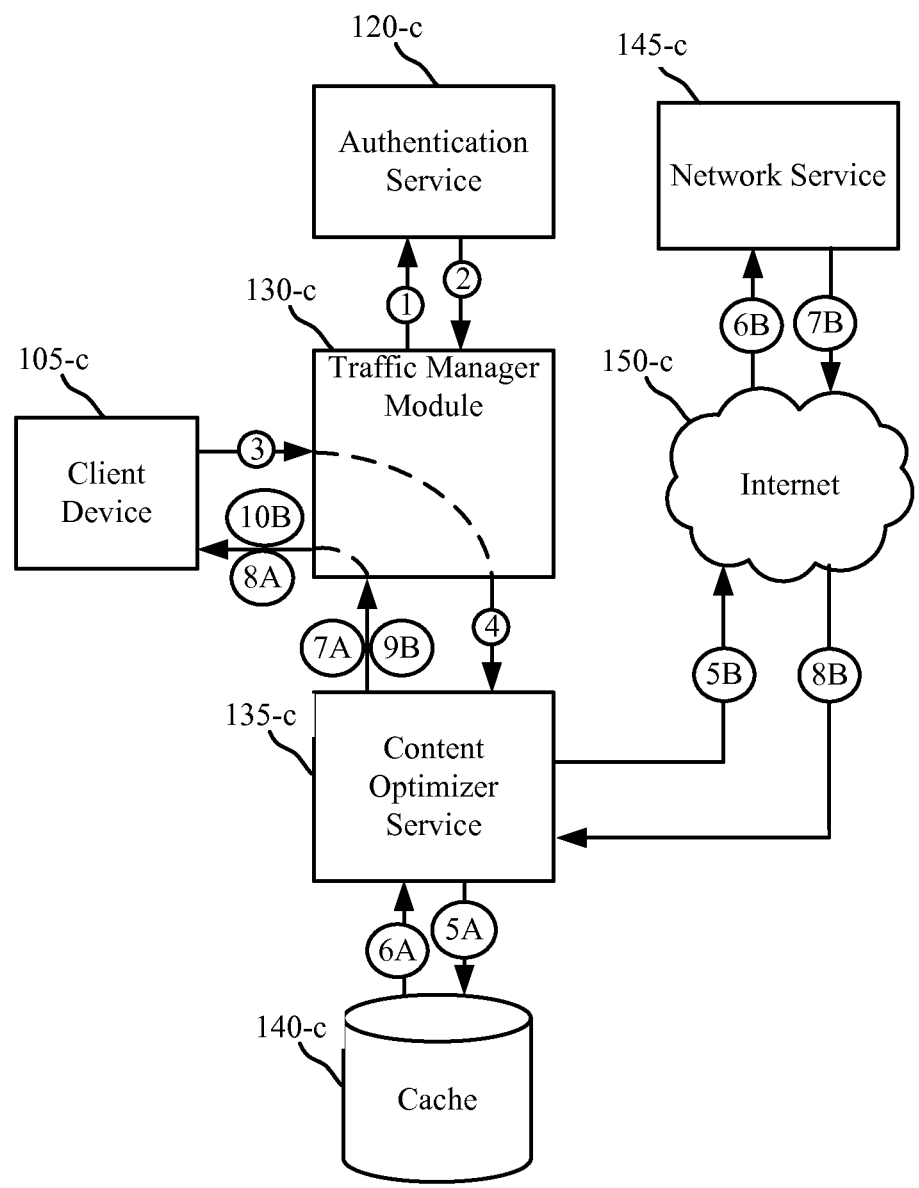

FIGS. 2A-2C are block diagrams of example message flows in an example systems 200, where each system includes a client device 105, a traffic manager module 130 acting as a proxy between the client device 105 and a network service 145, an authentication service 120, a content optimizer service 135, a cache 140, and a connection to the Internet 150. The systems 200 of FIGS. 2A-2C may be examples of the system 100 described above with respect to FIG. 1. Thus, the client devices 105 of FIGS. 2A-2C may be examples of the first network device of FIG. 1, the traffic manager modules 130 of FIGS. 2A-2C may be examples of the traffic manager module 130 of FIG. 1, the authentication service 120 of FIGS. 2A-2C may be an example of the authentication service 120 of FIG. 1, the network service 145 of FIGS. 2A-2C may be an example of the second network device 145 of FIG. 1, the content optimizer services 135 of FIGS. 2A-2C may be an example of the third network device 135 of FIG. 1, and the caches 140 of FIGS. 2A-2C may be an example of the cache 140 of FIG. 1.

For clarity in illustration, the access network 110, router(s) 115, and NAT service 125 of FIG. 1 are omitted in the systems 200 of FIGS. 2A-2C, but it will be understood that these or other components may be included in the systems 200 of FIGS. 2A-2C to enable communication between the various other elements of the systems 200. In the examples of FIGS. 2A-2C, the traffic manager module 130 may forward at least a portion of a message from the client device 105, or a response to the message from the network service 145, to the content optimizer service 135 on layer 7 analysis of application layer data in the message or the response.

For further clarity in illustration, certain aspects of the systems 200 of FIGS. 2A-2C are described in the context of requests for video objects and video optimization. It will be understood that the principles of FIGS. 2A-2C may apply to other types of messages, objects, and third-party services.

In the example of FIG. 2A, the traffic manager module 130-a may be configured to maintain a first connection with the client device 105-a and a second connection with the network service 145-a on behalf of the client device 105-a. At the first two points in the flow, the traffic manager module 130-a may authenticate the client device 105-a at the authentication service 120-a. At the third point in the flow, the client device 105-a may transmit one or more packets containing a message requesting a video object from the network service 145-a. The content of the message may be unidentifiable by the traffic manager module 130-a. The traffic manager module 130-a may store the unidentifiable message requesting the video object in a cache 140-a and forward the message to the network service 145-a over the proxy connection at the fourth point in the flow.

At the fifth point in the flow, the network service 145-a may receive the message requesting the video object. The network service 145-a may return the requested video object at the sixth point in the flow. At the seventh point in the flow, one or more packets may be received from the network service 145-a at the traffic manager module 130-a as a response to the request for the video object. The traffic manager module 130-a may inspect the application layer content of the packet(s), recognize that the packet(s) are related to a video object, and forward the received response to the content optimizer service 135-a at the eighth point in the flow. The content optimizer service 135-a may modify the video content of the video object received from the network service 145-a. As shown in FIG. 2A, an optimized version of the video object may be requested and received from the cache 140-a at the ninth and tenth points in the flow. Alternatively, the content optimizer service 135-a may convert the video object received from the network service 145-a on the fly and store the optimized version of the video object in the cache 140-a. The content optimizer service 135-a may return the optimized video object to the traffic manager module 130-a at the eleventh point in the flow. The traffic manager module 130-a may then forward the optimized video object to the client device 105-a over the first connection at the twelfth point in the flow.

In additional or alternative examples, the traffic manager module 130-a may set up a splice between the Internet service and the client device based on the application layer content of the request or response. The splice may move data between the Internet service and the client device without first copying the data into user space.

In the example of FIG. 2B, at the first two points in the flow, the traffic manager module 130-b may authenticate the client device 105-b at the authentication service 120-b. At the third point in the flow, the client device 105-b may transmit a message requesting a video object from the network service 145-b. The traffic manager module 130-b may inspect the application layer data of the request and determine that the request is for a video object. At the fourth point in the flow, the traffic manager module 130-b may terminate the message and request from the client device 105-*b*, and instruct the client device 105-*b* to retransmit the request to the content optimizer service 135-*b* at the fourth point in the flow. At the fifth point in the flow, the client device 105-*b* may transmit the request for the video object to the video optimizer service 135-*b*, either via the traffic manager module 130-*b* or directly. If the requested video object is available in the cache 140-*b*, the content optimizer 135-*b* may retrieve the requested video object from the cache 140-*b* (points 6A, 7A in the flow) and reformat or otherwise optimize the requested video object as appropriate for the client device 105-*b*. If the requested video object is not available in the cache 140-*b*, the content optimizer service 135-*b* may retrieve the requested video object from the network service 145-*b* (points 6B, 7B, 8B, and 9B in the flow), and reformat or otherwise optimize the video object as appropriate for the client device 105-*b*. The content optimizer service 135-*b* may then return the video object to the client device 105-*b* (point 8A or 10B in the flow).

In the example of FIG. 2C, at the first two points in the flow, the traffic manager module 130-*c* may authenticate the client device 105-*c* at the authentication service 120-*c*. At the third point in the flow, the client device 105-*c* may transmit a message containing a request for a video object from the network service 145-*c*. The traffic manager module 130-*c* may inspect the application layer data of the message, determine that the request is for a video object based on the application layer inspection, and forward the request to the content optimizer service 135-*c* at the fourth point in the flow. The content optimizer service 135-*c* may optionally retrieve the requested video object from a local cache 140-*c* (points 5A and 6B in the flow) or from the network service 145-*c* (points 5B, 6B, 7B, and 8B in the flow). The content optimizer service 135-*c* may reformat or otherwise optimize the video object as appropriate for the client device 105-*c*. The content optimizer service 135-*c* may then return the optimized video object to the client device 105-*c* via the traffic manager module 130-*c* (points 7A and 8A or 9B and 10B in the flow).

Figure 3:
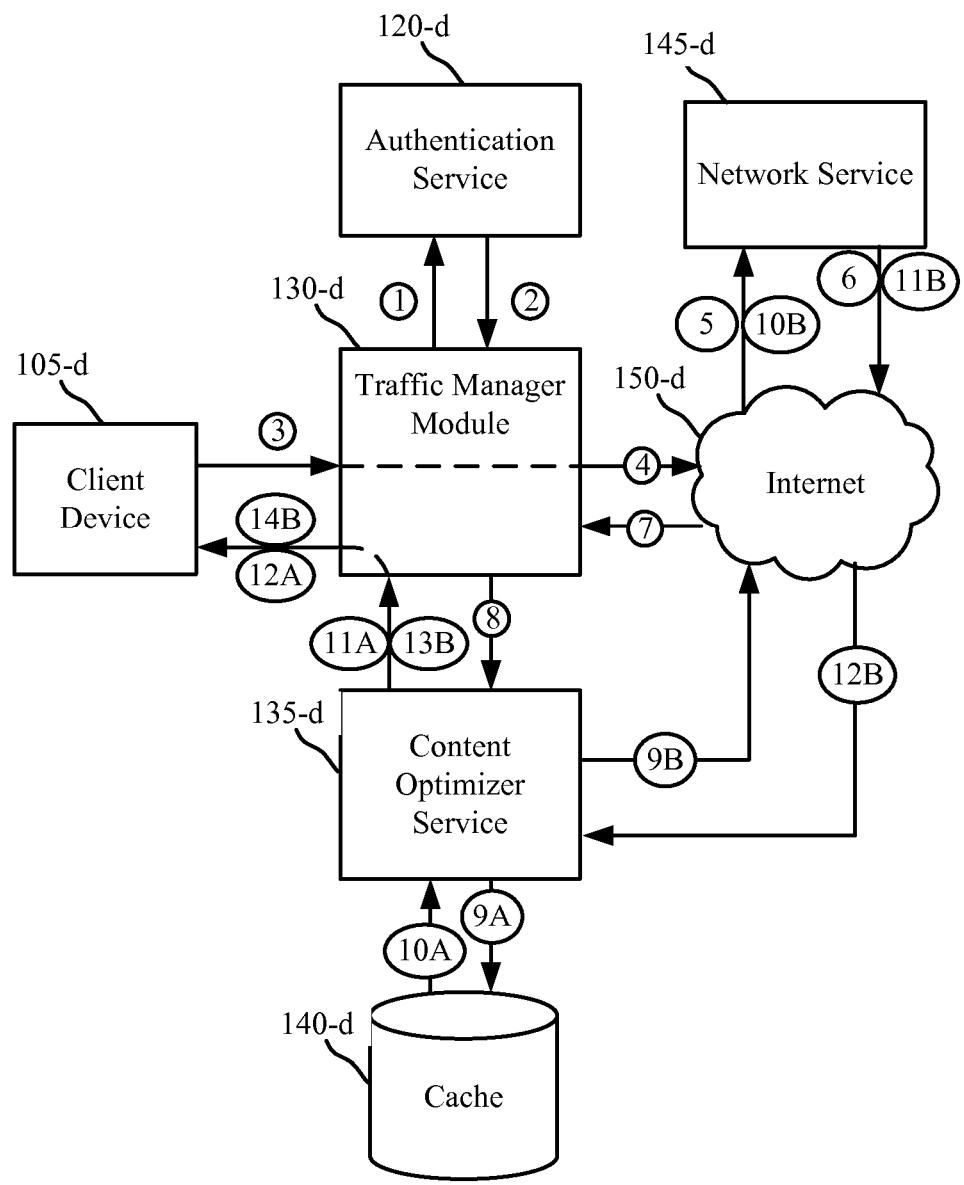
FIG. 3 is a block diagram of an example traffic management operation in a traffic manager module of a network according to various embodiments of the invention.

FIG. 3 is a block diagram of another message flow in an example network system 300 including a client device 105-*d*, a traffic manager module 130-*d* acting as a proxy for the client device 105-*d*, an authentication service 120-*d*, a content optimizer service 135-*d*, a cache 140-*d*, and a connection to the Internet 150-*d* or another packet data network. The system of 300 may be an example of one or more of the systems 100, 200 of FIGS. 1 and 2. In particular, the client device 105-*d* may be an example of the first network device 105 of FIG. 1 or one or more of the client devices 105 of FIGS. 2A-2C, the network service 145-*d* may be an example of the second network device 145 of FIG. 1 or one or more of the network services 145 of FIGS. 2A-2C, and the content optimizer service 135-*d* may be an example of the third network device 135 of FIG. 1 or one or more of the content optimizer services 135 of FIGS. 2A-2C.

As in FIGS. 2A-2C, the traffic manager module 130-*d* of FIG. 3 may be configured to maintain a first connection with the client device 105-*d* and a second proxy connection with an internet service on behalf of the client device 105-*d*. At the first two points in the flow, the traffic manager module 130-*d* may authenticate the client device 105-*d* at the authentication service 120-*d*. At a third point in the flow, the client device 105-*d* may transmit a message requesting a video object from the network service 145-*d*. The traffic manager module 130-*d* may cache the message and forward the request for the video object to the network service 145-*d* over the proxy connection with the network service 145-*d* at a fourth point in the flow. At fifth and sixth points in the flow, at least a portion of the requested video object may be received at the traffic manager module 130-*d* over the proxy connection in response to the request. The traffic manager module 130-*d* may inspect the application layer content of the packet(s) containing the video object and recognize that the application layer data of the packet(s) contains a video object. Based on this recognition, the traffic manager module 130-*d* may extract the message from its cache and retransmit the message request to the optimizer service 135-*d* at the eighth point in the flow. The traffic manager module 130-*d* may then terminate the request for the video object from the network service 145-*d*.

The content optimizer service 135-*d* may optionally retrieve the requested video object from a local cache 140-*d* (points 9A and 10B in the flow) or from the network service 145-*d* (points 9B, 10B, 11B, and 12B in the flow). The content optimizer service 135-*d* may reformat or otherwise optimize the video object as appropriate for the client device 105-*d*. The content optimizer service 135-*d* may then return the optimized video object to the client device 105-*d* via the traffic manager module 130-*d* (points 11A and 12A or 13B and 14B in the flow).

Figure 4:
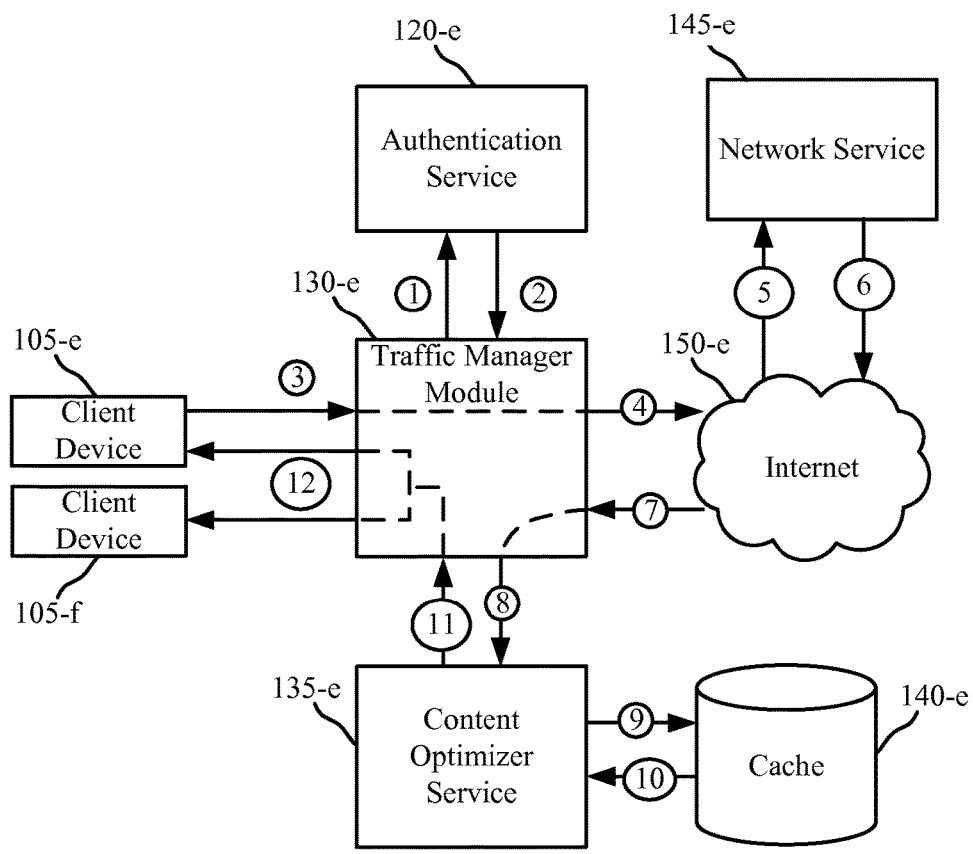
FIG. 4 is a block diagram of an example of a traffic management operation in a traffic manager module of a network according to various embodiments of the invention.

FIG. 4 is a block diagram of another message flow in an example system 400 including a first client device 105-*e*, a second client device 105-*f*, a traffic manager module 130-*e* acting as a proxy for the client device 105-*e*, an authentication service 120-*e*, a content optimizer service 135-*e*, a cache 140-*e*, a network service 145-*e* and a connection to the Internet 150-*e* or another packet data network. The system of 400 may be an example of one or more of the systems 100, 200, 300 of FIGS. 1-3. In particular, the first and second client device 105-*e*, 105-*f* may be examples of the first network device 105 of FIG. 1 or one or more of the client devices 105 of FIG. 2A-2C or 3. The network service 145-*d* may be an example of the second network device 145 of FIG. 1 or one or more of the network services 145 of FIG. 2A-2C or 3. The content optimizer service 135-*e* may be an example of the third network device 135 of FIG. 1 or one or more of the content optimizer services 135 of FIG. 2A-2C or 3.

As in FIGS. 1-3, the traffic manager module 130-*e* of FIG. 4 may be configured to maintain a first connection with the first client device 105-*e* and a second proxy connection with the network service 145-*e* on behalf of the first client device 105-*e*. At the first two points in the flow, the traffic manager module 130-*e* may authenticate the first client device 105-*e* at the authentication service 120-*e*. At the third point in the flow, the first client device 105-*e* may transmit a message requesting a video object from the network service 145-*e*. The traffic manager module 130-*e* may retrieve the video object from the network service 145-*e* at the fourth, fifth, sixth, and seventh points in the flow. At the eighth point in the flow, one or more packets may be received at the traffic manager module 130-*e* over the proxy connection in response to the request for the video object. The traffic manager module 130-*e* may inspect the application layer content of the packet(s), recognize that the packet(s) are related to a video object, and forward the application layer data from the packet(s) to the content optimizer service 135-*e*. The content optimizer service 135-*d* may optionally retrieve the requested video object from a local cache 140-*e* (points 9 and 10 in the flow) or from the network service 145-*e* (not shown). The content optimizer service 135-*e* may reformat or otherwise optimize the video object as appropriate for the client device 105-*e*. The content optimizer service 135-*e* may then return the optimized video object to the traffic manager at the eleventh point for forwarding to the first client device 105-*e* as a response to the original message from the first client device 105-*e*.

The traffic manager module 130-*e* may further determine from the application layer content of the packet(s) containing the optimized video object that the video object is the same video object requested by the second client device 105-*f* over a separate connection with the traffic manager module 130-*e*. The traffic manager module 130-*e* may then splice the connection with the first client device 105-*e* and the connection with the second client device 105-*f* at the twelfth point in the flow such that at least a portion of the optimized video object transmitted to the first client device 105-*e* is concurrently transmitted to the second client device 105-*f*. In this way, the traffic manager module 130-*c* may provide the requested video object to the second client device 105-*f* without issuing another request to the network service 145-*e* for the same video object on behalf of the second client device 105-*f*.

Figure 5:
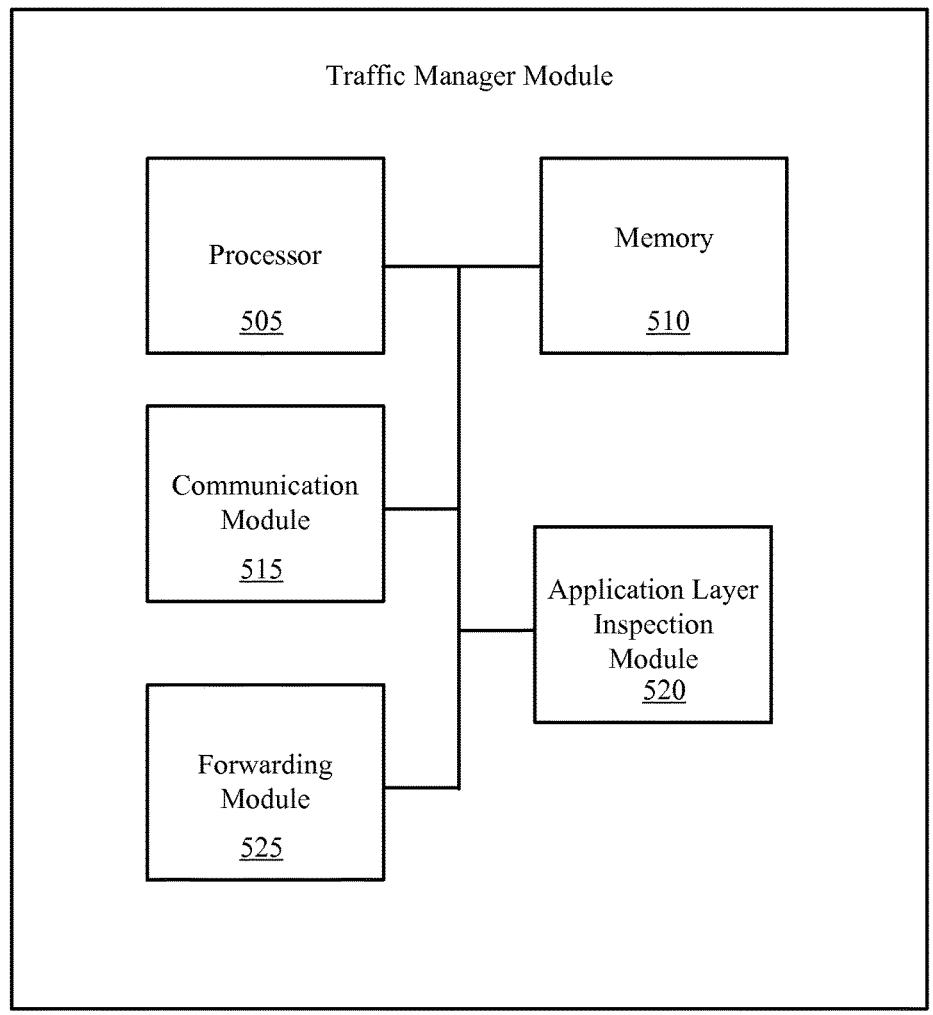
FIG. 5 is a block diagram of an example of a traffic manager module according to various embodiments of the invention.

FIG. 5 is a block diagram of an example traffic manager module 130-*f*. The traffic manager module 130-*f* may be an example of the traffic manager modules 130 described in previous Figures. The traffic manager module 130-*f* may include a processor 505, a memory, 510, a communication module 515, an application layer inspection module 520, a service communication module 515, and an application layer inspection module 520. Each of these components may be in communication with one another, directly or indirectly. In certain examples, the processor 505 may be configured to execute computer-readable code stored on the memory 510 to implement one or more of the functions of the communication module 515, the application layer inspection module 520, and/or the forwarding module 525. Thus, the processor 505, when specially programmed according to the computer-readable code stored on the memory 510, may be a means for performing the functionality of the communication module 515, the application layer inspection module 520, and/or the forwarding module 525.

The communication module 515 may be configured to communicate with at least a first network device, a second network device, and a third network device. The traffic manager module 130-*f* may serve as a proxy between the first network device and the third network device. The communication module 515 may be configured to receive a message from the first network device to the second network device. The application layer inspection module 520 may perform an application layer inspection on at least one of the message or a response to the message from the second network device. The forwarding module 525 may be configured to forward the message or the response to the message to a third network device based on the application layer inspection at the traffic manager module.

Figure 6:
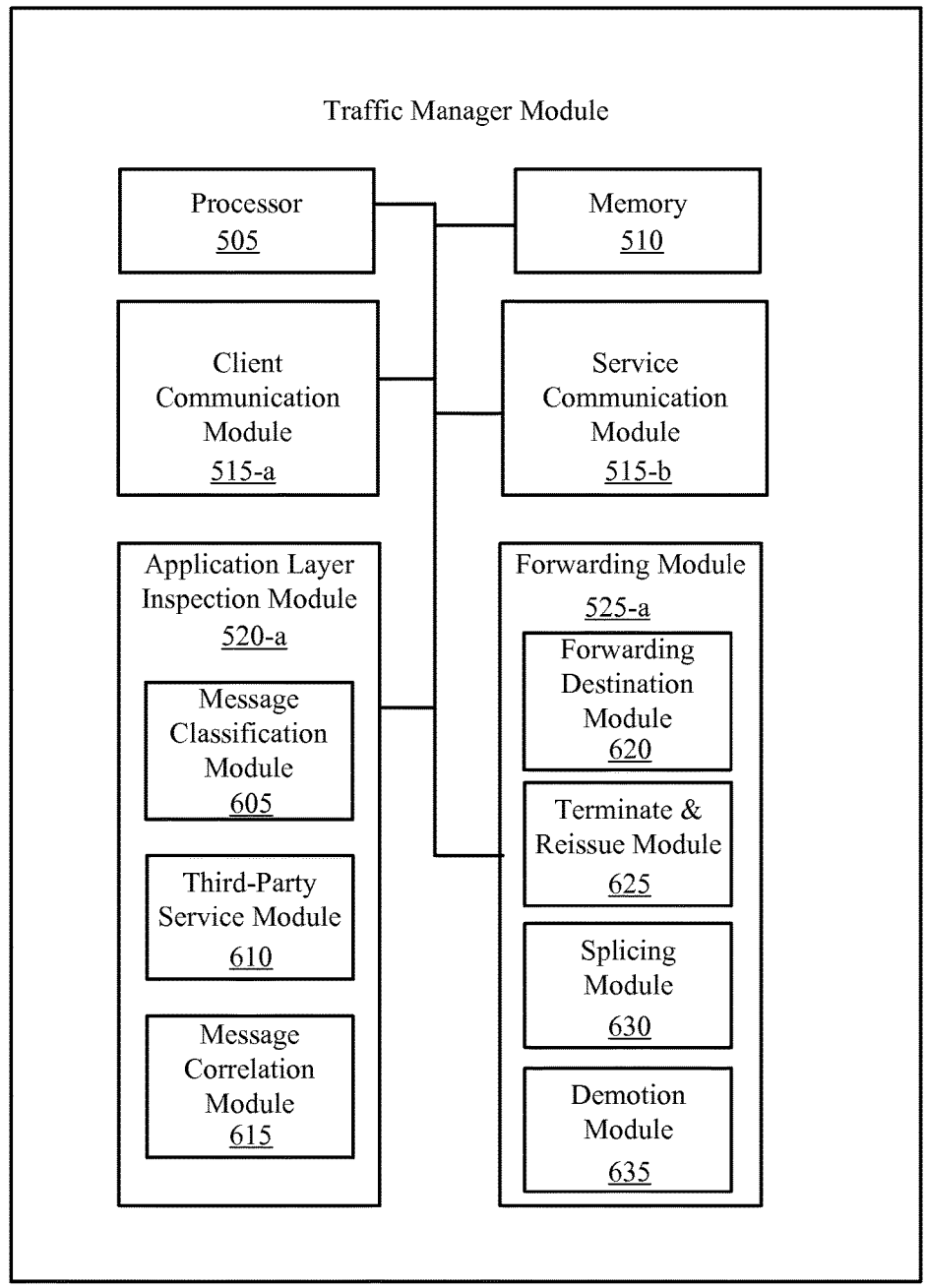
FIG. 6 is a block diagram of an example of a traffic manager module according to various embodiments of the invention.

FIG. 6 is a block diagram of another example of a traffic manager module 130-*g*. The traffic manager module 130-*g* may be an example of one or more of the traffic manager modules 130 described in previous Figures. The traffic manager module 130-*g* may include a processor 505, a memory 510, a client communication module 515-*a*, a service communication module 515-*b*, an application layer inspection module 520-*a*, and a forwarding module 525-*a*. Each of these components may be in communication with one another, directly or indirectly.

In certain examples, the processor 505 may be configured to execute computer-readable code stored on the memory 510 to implement one or more of the functions of the client communication module 515-*a*, the service communication module 515-*b*, the application layer inspection module 520-*a*, and/or the forwarding module 525-*a*. Thus, the processor 505, when specially programmed according to the computer-readable code stored on the memory 510, may be a means for performing the functionality of the client communication module 515-*a*, the service communication module 515-*b*, the application layer inspection module 520-*a*, and/or the forwarding module 525-*a*.

The client communication module 515-*a* may be configured to establish a connection with at least a first network device, and the service communication module 515-*b* may be configured to establish a proxy connection to at least a second network device on behalf of the first network device. The client communication module 515-*a* may receive a message from the first network device to the second network device. The application layer inspection module 520-*a* may perform an application layer inspection on at least one of the messages or a response to the message from the second network device. The forwarding module 525-*a* may be configured to forward the message or the response to the message to a third network device based on the application layer inspection at the application layer inspection module 520-*a*.

The application layer inspection module 520-*a* may include a message classification module 605 configured to determine, based on the application layer inspection, a type of data (e.g., video object, sound object, web page, spreadsheet, document, etc.) being requested or provided in connection with the message. The third-party service module 610 may determine, based on the application layer inspection, that a third-party service provided by the third network device is applicable to either the message from the first network device or the response to the message from the second network device. The selection of the third network device and the forwarding of the message or the response to the message to the third network device may be based on the determined type of data associated with the message. For example, the third-party service module 610 may determine, based on the application layer inspection and computations at the message classification module, that the requested object is a video file. Accordingly, the forwarding module 525-*a* may choose to forward the message or the response to the message to a video optimizer service. Upon receiving the response to the message from the third network device, the traffic manager module 130-*g* may forward the response to the message to the first network device. The response to the message may include a modified version of the object originally requested by the first network device. For example, where the third network device is a video optimizer service, the response forwarded to the first client device from the traffic manager module 130-*g* may include a reformatted or re-encoded version of a requested video file.

The forwarding module 525-*a* may include a forwarding destination module 620, a terminate and reissue module 625, a splicing module 630, and a demotion module 635. Each of these modules may be configured to perform one or more performance enhancement actions based on the application layer content of packets analyzed at the application layer inspection module 520-*a*.

In certain examples, the traffic manager module 130-*g* may receive at least a portion of the response to the message from the second network device, and the forwarding destination module 620 may forward at least a portion of the response to the message to the third network device, as selected based on the application layer inspection. For example, the forwarding destination module 620 may forward a message from the first network device or the response from the second network device an intermediate service (e.g., video optimizer, etc.) or alternate destination.

Additionally or alternatively, the traffic manager module 130-g may receive at least a portion of the response to the message from the second network device, and the terminate and reissue module 625 may terminate a connection with the second network device related to the message based on the application layer inspection. The terminate and reissue module 625 may further forward the message to the third network device based on the application layer inspection. Additionally or alternatively, the terminate and reissue module 625 may transmit an instruction to the first network device to reissue the message to the third network device.

The splicing module 535 may mirror data from one connection to another connection or combine data from multiple connections into a single output stream. For example, the splicing module 630 may determine, based on the application layer inspection, that the response to the message from the first network device is related to a second message from a fourth network device. The splicing module 630 may then forward at least a portion of the response to the message (in an original or optimized form) to both the first network device and the fourth network device.

The demotion module 540 may selectively demote connections (e.g., to a different protocol, lower network layer, etc.) based on one or more predefined criteria and the application layer inspection.

Figure 7:
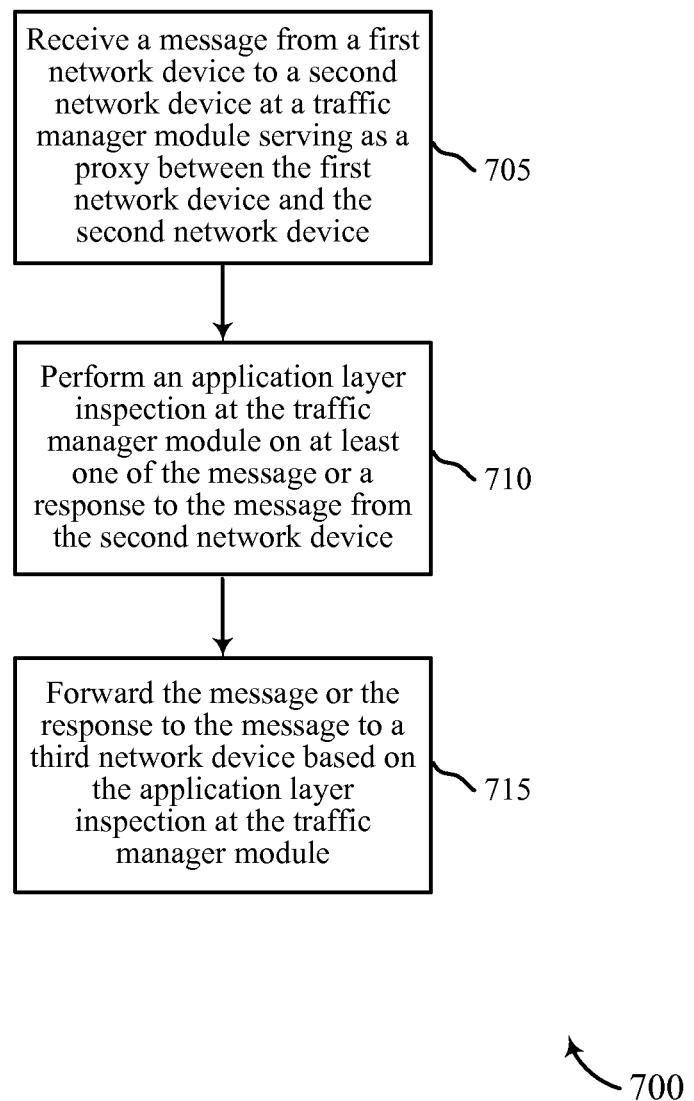
FIG. 7 is a flowchart diagram of an example of a method of managing traffic in a traffic manager module of a network according to various embodiments of the invention.

FIG. 7 is a flowchart diagram of an example of a method 700 of managing traffic in a traffic manager module of a network. One or more of the traffic manager modules 130 described above with reference to the previous Figures may be a means for performing the method 700.

At block 705, a message may be received from a first network device to a second network device at a traffic manager module serving as a proxy between the first network device and the second network device. At block 710, an application layer inspection may be performed at the traffic manager module on at least one of the message or a response to the message from the second network device. At block 715, the message or the response to the message may be forwarded to a third network device based on the application layer inspection at the traffic manager module.

Figure 8:
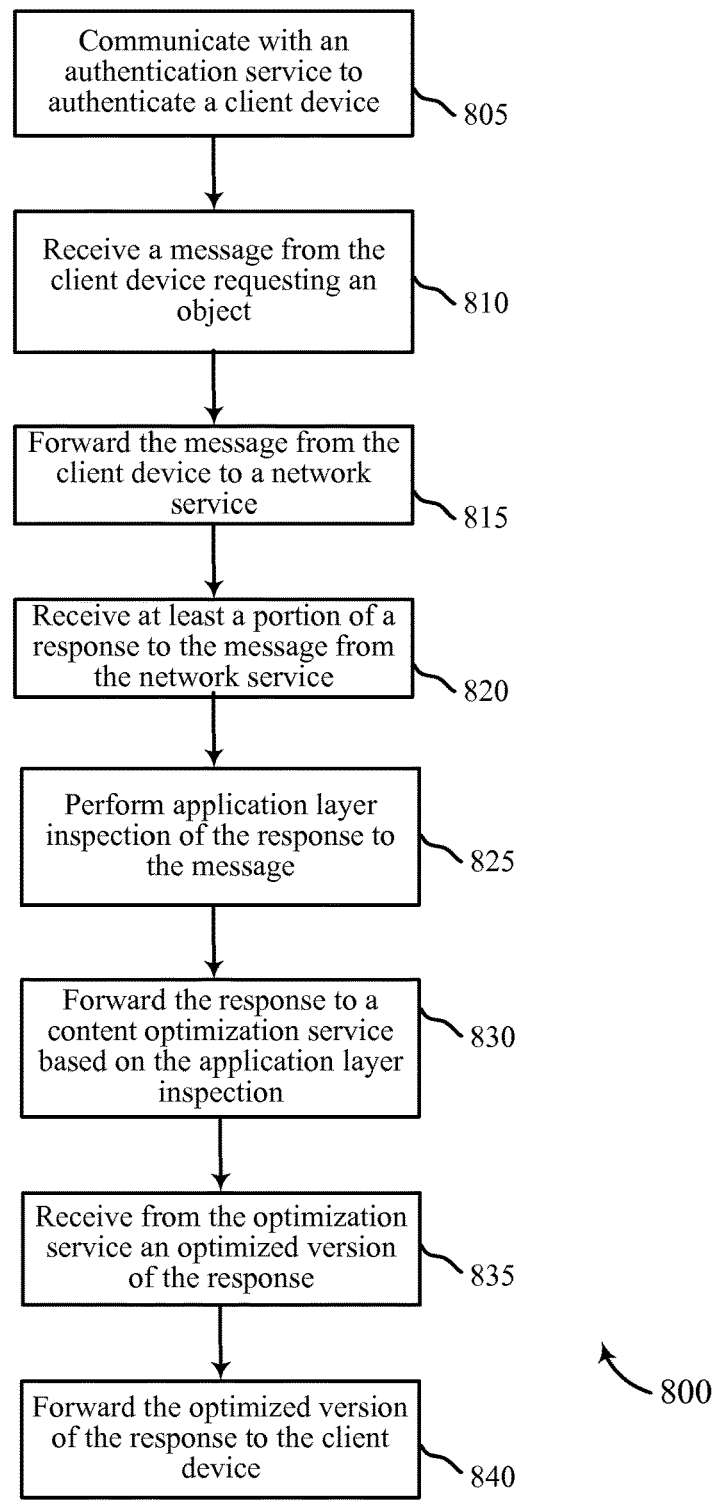
FIG. 8 is a flowchart diagram of an example of a method of managing traffic in a traffic manager module of a network according to various embodiments of the invention.

FIG. 8 is a flowchart diagram of an example of a method 800 of managing traffic in a traffic manager module of a network. One or more of the traffic manager modules 130 described above with reference to the previous Figures may be a means for performing the method 800 of FIG. 8. The method 800 of FIG. 8 may be an example of the method 700 of FIG. 7.

At block 805, the traffic manager module may communicate with an authentication service to authenticate a client device (i.e., the "first network device" of FIG. 7). At block 810, a message requesting a network object may be received at the traffic manager module from the client device. At block 815, the request may be forwarded from the client device to a network service (i.e., "the second network device" of FIG. 7). At block 820, at least a portion of a response to the request may be received from the network service. At block 825, an application layer inspection of the response to the message may be performed. At block 830, the received response may be forwarded from the traffic manager module to an optimization service (i.e., "the third network device" of FIG. 7) based on the application layer inspection performed on the response to the request by the traffic manager module. At block 835, an optimized version of the response may be received from the optimization service. At block 840, the optimized version of the response may be forwarded to the client device in response to the message.

Figure 9:
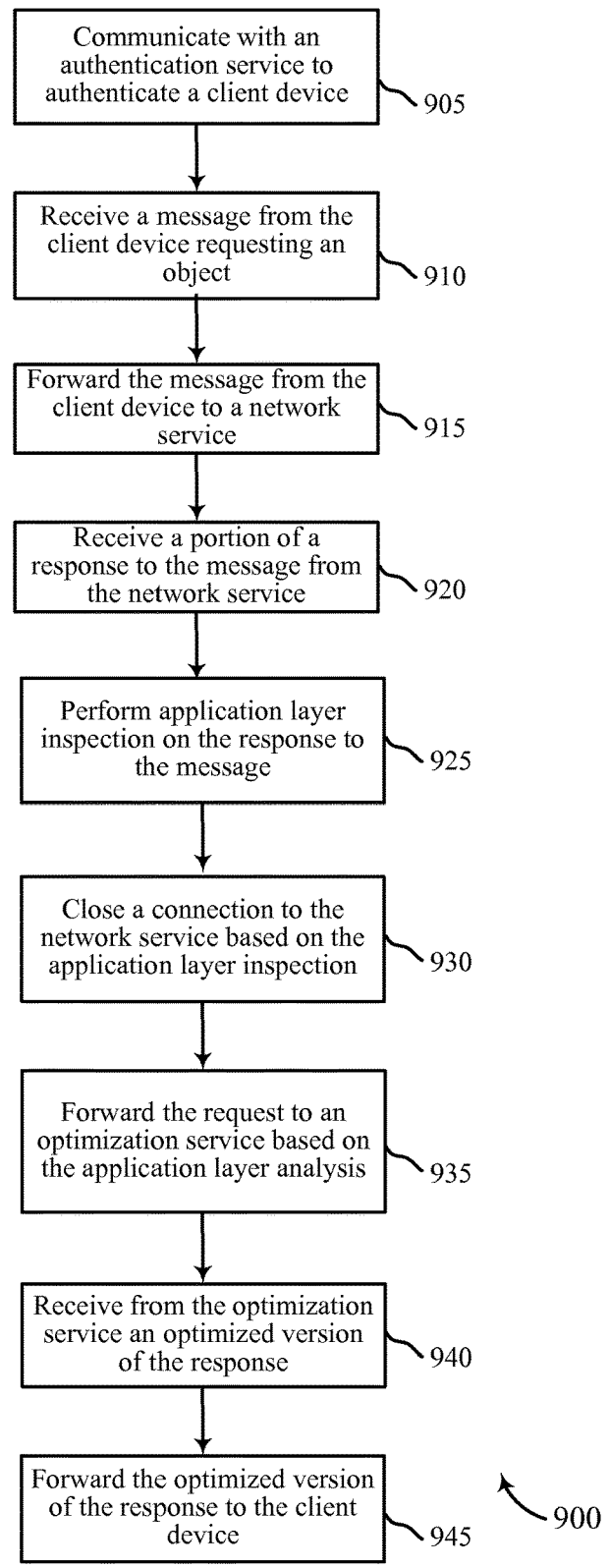
FIG. 9 is a flowchart diagram of an example of a method of managing traffic in a traffic manager module of a network according to various embodiments of the invention.

FIG. 9 is a flowchart diagram of another example of a method 900 of managing traffic in a traffic manager module of a network. One or more of the traffic manager modules 130 described above with reference to the previous Figures may be a means for performing the method 900 of FIG. 9. The method 900 of FIG. 9 may be an example of the method 700 of FIG. 7.

At block 905, the traffic manager module may communicate with an authentication service to authenticate a client device (i.e., the "first network device" of FIG. 7). At block 910, a message requesting for a network object may be received at the traffic manager module from the client device. At block 915, the request may be forwarded from the client device to a network service (i.e., the "second network device" of FIG. 7). At block 920, at least a portion of a response to the request may be received from the network service. At block 925, an application layer inspection may be performed on at least a portion of the response to the message received from the network service. At block 930, the connection to the network service may be closed based on the application layer inspection of the received portion of the response performed at the traffic manager module. At block 935, the message requesting the network object may be forwarded to an optimization service (i.e., the "third network device") based on the application layer inspection performed on the response to the request by the traffic manager module. At block 940, an optimized version of the response may be received from the optimization service. At block 945, the optimized version of the response may be forwarded to the client device.

Figure 10:
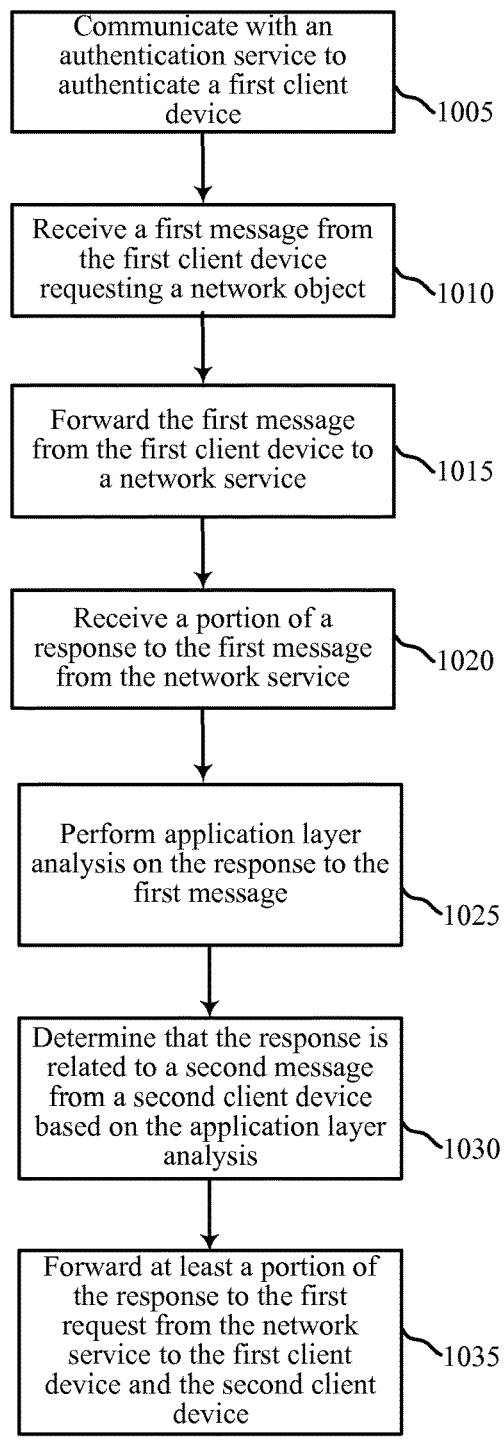
FIG. 10 is a flowchart diagram of an example of a method of managing traffic in a traffic manager module of a network according to various embodiments of the invention.

FIG. 10 is a flowchart diagram of another example of a method 1000 of managing traffic in a traffic manager module of a network. One or more of the traffic manager modules 130 described above with reference to the previous Figures may be a means for performing the method 1000 of FIG. 10. The method 1000 of FIG. 10 may be an example of the method 700 of FIG. 7.

At block 1005, the traffic manager module may communicate with an authentication service to authenticate a client device (i.e., the "first network device" of FIG. 7). At block 1010, a first message requesting a network object may be received at the traffic manager module from the client device. At block 1015, the first message may be forwarded from the client device to a network service (i.e., the "second network device" of FIG. 7). At block 1020, at least a portion of a response to the request may be received from the network service. At block 1025, an application layer inspection may be performed on the response. At block 1030, the traffic manager module may determine from the application layer inspection of the received portion of the response that the response is related to a second message from a second client device. At block 1035, at least a portion of the response to the first message from the network service may be forwarded to the first client device and the second client device without requesting the network object from the network service on behalf of the second client device.

Per-Stream QoS Bits

An additional or alternative feature of the traffic manager module 130 described above may be the association of Quality of Service (QoS) bits with individual messages or responses over a connection rather than for a connection as a whole. In this way, the QoS requirements for connections can be dynamically toggled with each request or response to balance bandwidth requirements in real-time.

Figure 11:
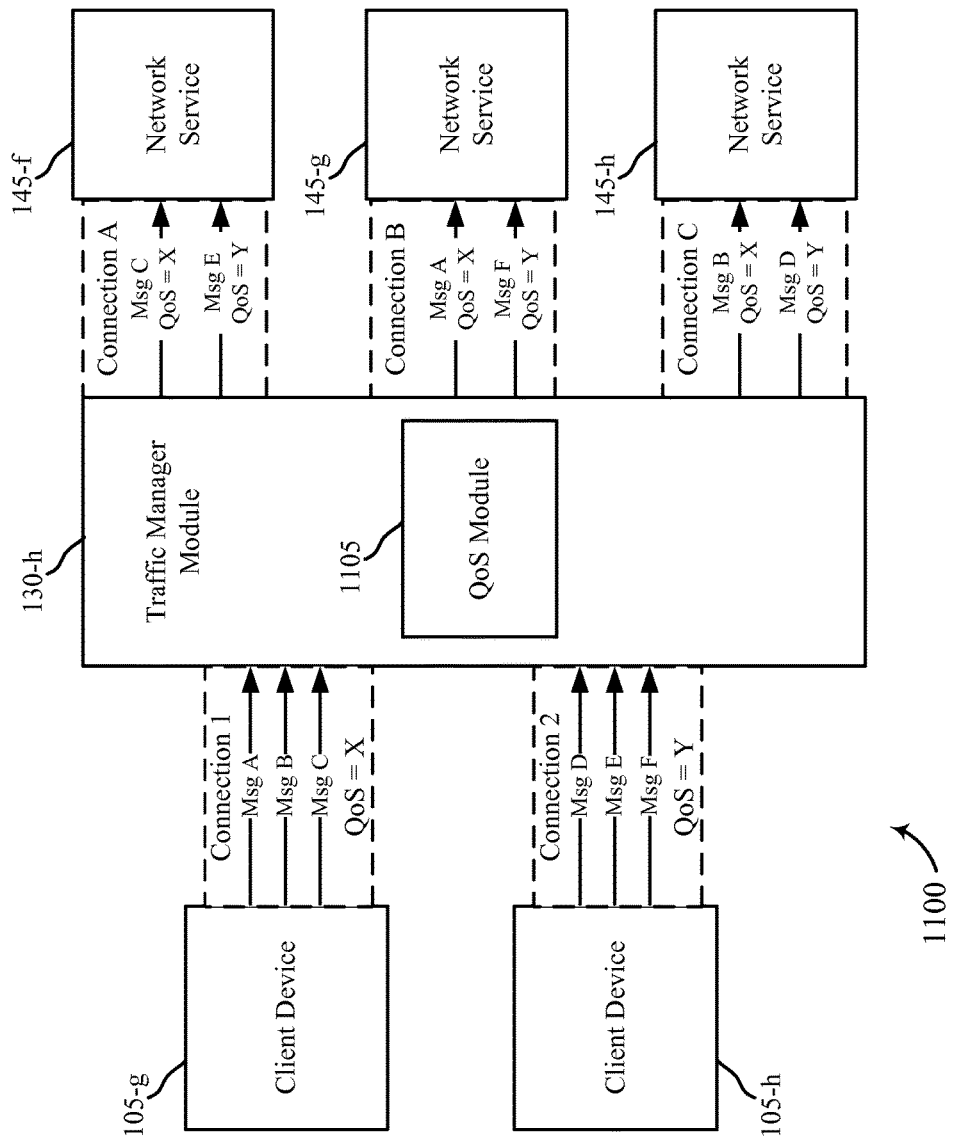
FIG. 11 is a block diagram of an example of a system incorporating a traffic manager module according to various embodiments of the invention.

For example, FIG. 11 is a block diagram of an example system 1100 in which a traffic manager module 130-*h* establishes connections with client devices 105 and forwards requests from the client devices to network services 145 over proxy connections. The system 1100 may be an example of one or more of the systems 100, 200, 300, 400 described above with respect to previous Figures. In the example of FIG. 11, the traffic manager module 130-*h* may have established a first connection ("Connection 1") with a first client device 105-*g* and a second connection ("Connection 2") with a second client device 105-*h*. In certain examples, each connection may be a TCP or other layer 4 connection. Each connection may be associated with a specific set of negotiated or set QoS parameters. For example, Connection 1 may have QoS parameter set X and Connection 2 may have QoS parameter set Y.

The traffic manager module 130-*h* may receive a number of messages over a single connection. For example, as shown in FIG. 11, the traffic manager module 130-*h* may receive Message A, Message B, and Message C over Connection 1. Additionally, the traffic manager module 130-*h* may receive Message D, Message E, and Message F over Connection 2. The messages may request objects or other data available from the network services 145. The traffic manager module 130-*h* may be configured to fan out the requests it receives to different network services 145 over proxy connections on behalf of the client devices 105. A network service 145 may be selected for each request based on the availability of the different network services 145 to respond to the requests or to increase efficiency.

A QoS module 1105 of the traffic manager module 130-*h* may identify the QoS requirements of the connection on which each message was received and associate that set of QoS requirements with the message when the message is forwarded to the selected service 145. Thus, even though messages received over a client connection may be disassociated from that connection on the proxy side of the traffic manager module 130-*h*, each message forwarded to a network service 145 may carry the QoS requirements of the client connection over which that message was originally received. As such, QoS requirements may be defined on a per-connection basis on the client side of the traffic manager module 130-*h* and on a per-message basis on the proxy side of the traffic manager module 130-*h*.

Figure 12:
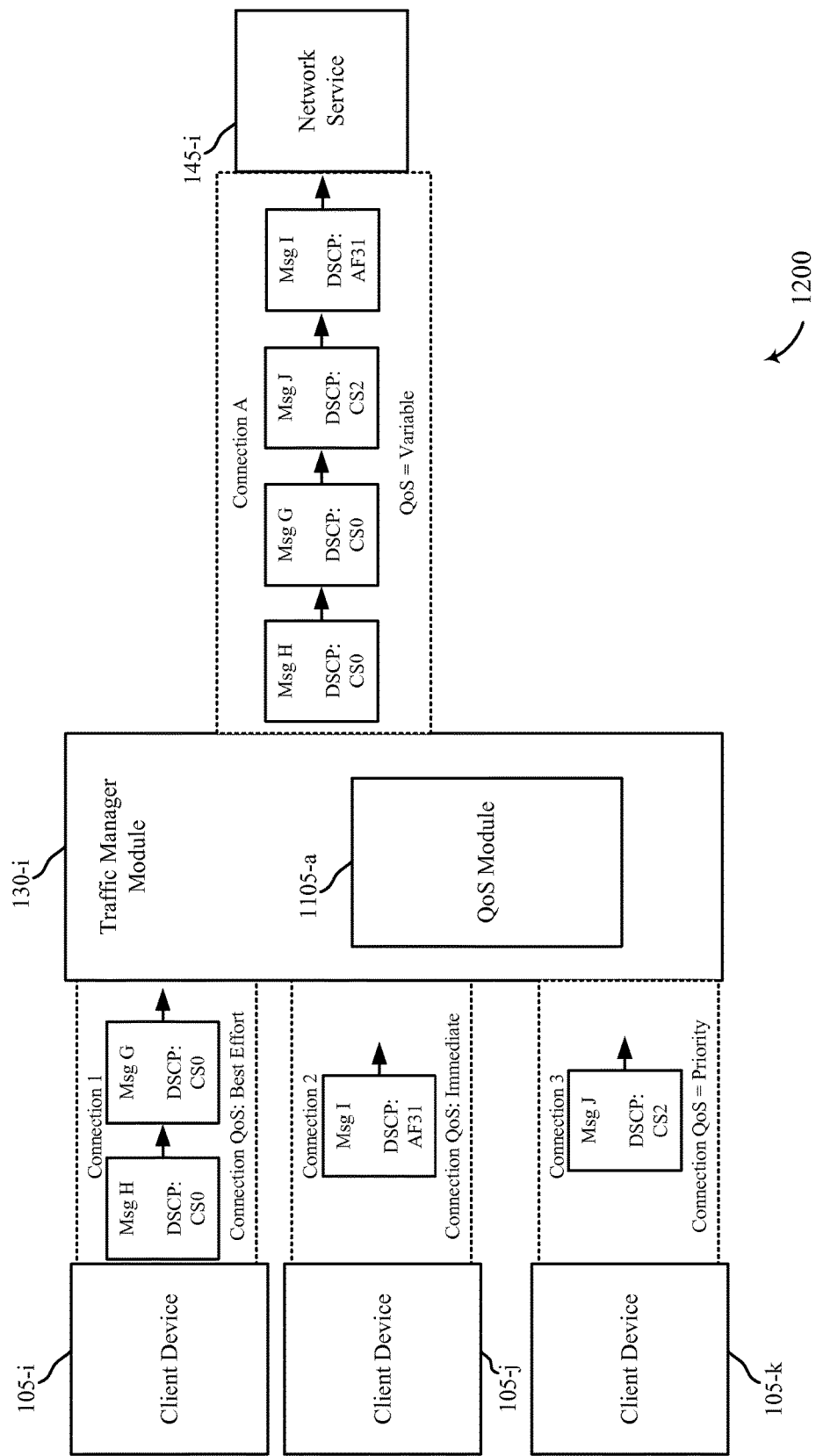
FIG. 12 is a block diagram of an example of a system incorporating a traffic manager module according to various embodiments of the invention.

FIG. 12 is a block diagram of another example of a system 1200 in which a traffic manager module 130-*i* establishes connections with client devices 105 and forwards requests from the client devices to network services 145 over proxy connections. The system 1200 may be an example of one or more of the systems 100, 200, 300, 400, 1100 described above with respect to previous Figures. In the example of FIG. 12, the traffic manager module 130-*h* may have established a first connection ("Connection 1") with a first client device 105-*i*, a second connection ("Connection 2") with a second client device 105-*j*, and a third connection ("Connection 3") with a third client device 105-*k*. In certain examples, each connection may be a TCP or other layer 4 connection. Each connection may be associated with a specific set of negotiated or set QoS parameters. For example, Connection 1 may have a set of negotiated QoS parameters consistent with Best Effort packet delivery, Connection 2 may have a set of negotiated QoS parameters consistent with Immediate packet delivery, and Connection 3 may have a set of negotiated QoS parameters consistent with Priority packet delivery. That is, packets from Connection 2 may be given priority over packets from Connection 3, which may be given priority over packets from Connection 1.

The set of QoS parameters negotiated for each connection on the client side may be reflected in a set of one or more Type of Service (ToS) parameter bits included in the header of packets transmitted over the connection. In the present example, these ToS parameter bits may be Differentiated Services Code Point (DSCP) bits, as defined in standards promulgated by the Internet Engineering Task Force. Alternatively, other kinds of ToS parameter bits may be included in the packet headers. In the present example, packets transmitted over Connection 1 may have ToS parameter bits indicating a DSCP of CS0, which reflects the lower priority "best effort" QoS parameters of Connection 1. Packets transmitted over Connection 2 may have ToS parameter bits indicating a DSCP of AF31, which reflects the "immediate" QoS parameters of Connection 2. Packets transmitted over Connection 3 may have ToS parameters indicating a DSCP of CS2, which reflects the "priority" QoS parameters of Connection 3.

For clarity in illustration, the packets from each of the client-side connections includes a message intended for a single network service 145-*i*. However, it will be understood that a single connection may include messages intended for different network services 145, as shown in FIG. 11. In the present example, the traffic manager module 130-*i* may act as proxy to the network service 145-*i* for multiple client devices 105, and the messages from each of the client-side connections may be transmitted over a single connection between the traffic manager module 130-*i* and the network service 145-*i*.

In some proxy systems, DSCP or other ToS parameter bits may be stripped from packets received at the proxy, and the messages contained in those packets may be forwarded to the network service 145-*i* using ToS parameter bits reflective of QoS parameters negotiated specifically for the connection between the proxy and the network service 145-*i*. Such systems treat all messages received from client devices equally, and disregard the differences in negotiated QoS parameters that may be present between the client-side connections. To address this issue, the traffic manager module 130-*i* of the present application includes a QoS module 1105-*a* configured to read and store the DSCP or other ToS parameter bits associated with packets carrying messages from different Connections, and then dynamically toggle the DSCP or other ToS parameter bits associated with packets carrying messages to the network service 145-*i* from the traffic manager module 130-*i* based on the stored ToS parameter bits associated with those messages on the client side.

Thus, as shown in FIG. 12, the DSCP bits associated with each message transmitted over Connection A varies in accordance with the QoS parameters negotiated for the client side connection over which that message was originally received at the traffic manager module 130-*i*. As such, the effective QoS of Connection A may be dynamically varied according to the QoS associated with the messages being transmitted to the network service 145-*i*.

For the purposes of clarity, only messages transmitted in the direction from the client devices 105 to the network service 145-*i* are shown in FIG. 12. Nevertheless, it will be understood that the network service 145-*i* may also dynamically toggle the effective QoS of Connection A in the other direction as responses are transmitted to the client messages. This toggling may account for the varying QoS parameters associated with the messages to which the network service 145-*i* is responding. For example, the network service 145-*i* may remember the ToS parameter bits of a received client message and transmit a response to that message having the same ToS parameter bits. The ToS parameter bits may be preserved during the forwarding of the response to the appropriate client device 105. In this way, bilateral QoS standards may be maintained on a per-connection basis on the client side and on a per-message basis on the proxy side.

Figure 13:
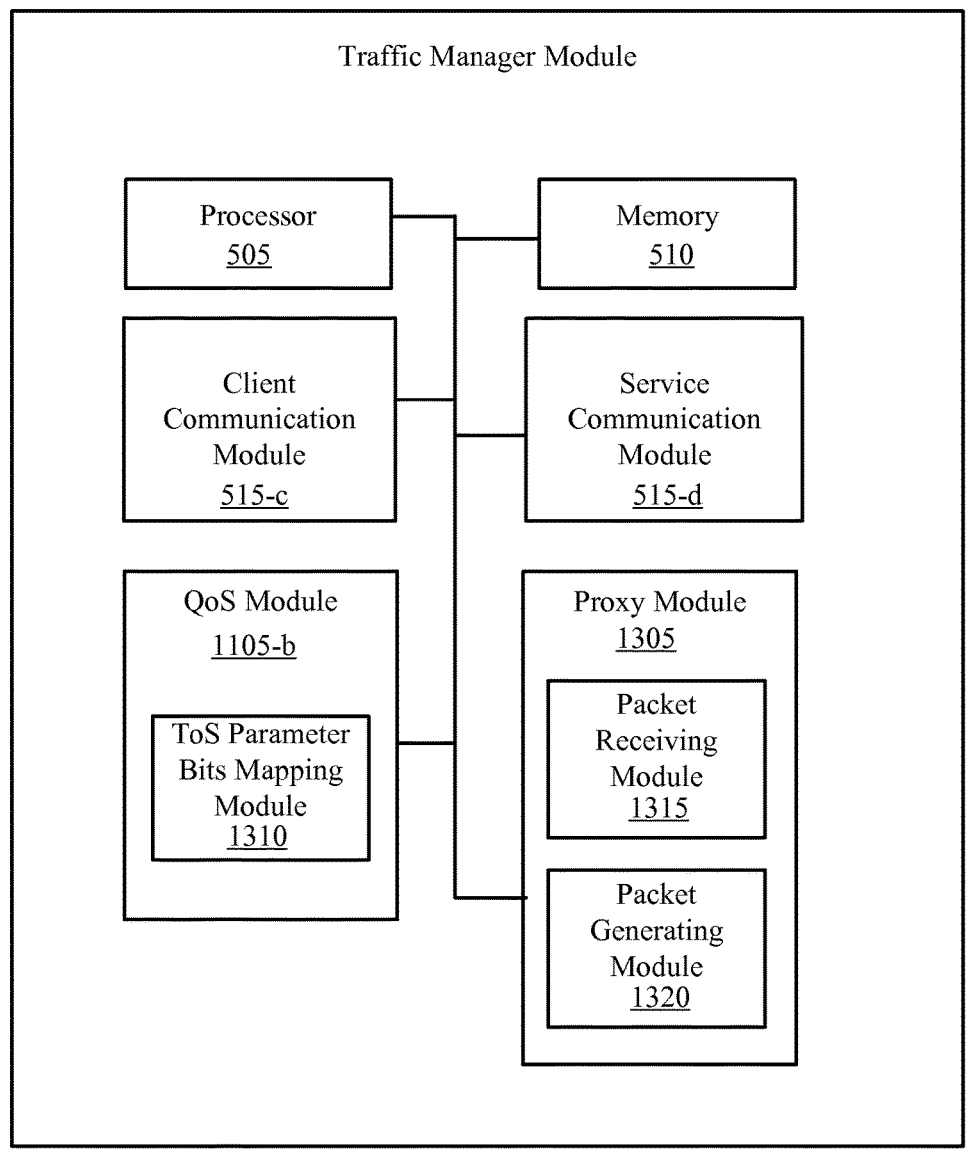
FIG. 13 is a block diagram of an example of a traffic manager module according to various embodiments of the invention.

FIG. 13 is a block diagram of another example of a traffic manager module 130-*j*. The traffic manager module 130-*j* may be an example of one or more of the traffic manager modules 130 described in previous Figures. The traffic manager module 130-*j* may include a processor 505, a memory 510, a client communication module 515-*c*, a service communication module 515-*d*, a QoS module 1105-*b*, and a proxy module 1305. Each of these components may be in communication with one another, directly or indirectly.

In certain examples, the processor 505 may be configured to execute computer-readable code stored on the memory 510 to implement one or more of the functions of the client communication module 515-*c*, the service communication module 515-*d*, the QoS module 1105-*b*, and/or the proxy module 1305. Thus, the processor 505, when specially programmed according to the computer-readable code stored on the memory 510, may be a means for performing the functionality of the client communication module 515-*c*, the service communication module 515-*d*, the QoS module 1105-*b*, and/or the proxy module 1305.

The client communication module 515-*c* may be configured to establish a connection with one or more client devices, and the service communication module 515-*d* may be configured to establish a connection to at least one network service on behalf of the client devices. The proxy module 1305 may include a packet receiving module 1315 configured to receive packets containing a plurality of messages for the network service from the client devices. Each of the messages may be associated with at least one QoS parameter, as negotiated for the connection between the source client device and the traffic manager module 130-*j*. The proxy module 1305 may also include a packet generating module 1320 configured to encapsulate the messages from the client devices into new packets directed to the network service over the connection between the traffic manager module 130-*j* and the network service. The QoS module 1105-*b* may be configured to dynamically alter a QoS of the connection between the traffic manager module 130-*j* and the network service during the transmission of each message based on the at least one QoS parameter associated with that message.

In certain examples, the packet receiving module 1315 of the proxy module 1305 may receive a first set of one or more packets from one of the plurality of client devices, the first set of one or more packets including a first message. The QoS module 1105-*b* may determine, from the first set of one or more packets, the at least one QoS parameter associated with the first message. The at least one QoS parameter may be determined based on ToS parameter bits in the first set of one or more packets. For example, the at least one QoS parameter may be determined based on DSCP bits associated with the first set of one or more packets. In some examples, a ToS parameter bits mapping module 1310 may read and store one or more ToS parameter bits in the headers of the first set of one or more packets.

The packet generating module 1320 may then create a second set of one or more packets containing the first message. The ToS parameter bits mapping module 1310 may set at least one ToS parameter of the second set of one or more packets based on the at least one known QoS parameter of the first set of one or more packets. More specifically, the ToS parameter bits mapping module 1310 may match the ToS parameter bits (e.g., DSCP bits) of the second set of one or more packets to the ToS parameter bits (e.g., DSCP bits) of the first set of one or more packets. The second set of one or more packets may be transmitted to the network service over the connection between the traffic manager module and the network service.

In certain examples, the packet receiving module 1315 may receive a third set of one or more packets including a response from the network service to the first message. The QoS module 1105-*b* may determine, from the third set of one or more packets, at least one QoS parameter associated with the response from the network service to the first message. The at least one QoS parameter associated with the response may be determined based on ToS parameter bits (e.g., DSCP bits) in the header(s) of the third set of one or more packets.

The packet generating module 1320 may create a fourth set of one or more packets including the response from the network service to the first message. The QoS module 1105-*b* may set at least one ToS parameter of the fourth set of one or more packets based on the at least one QoS parameter associated with the response from the network service to the first message. For example, the ToS parameter bits mapping module 1310 may set the ToS parameter bits (e.g., DSCP bits) in the header(s) of the fourth set of one or more packets to match the ToS parameter bits (e.g., DSCP bits) of the third set of one or more packets. The fourth set of one or more packets may then be transmitted to the client device over the connection between the client device and the traffic manager module 130-*j*.

Figure 14:
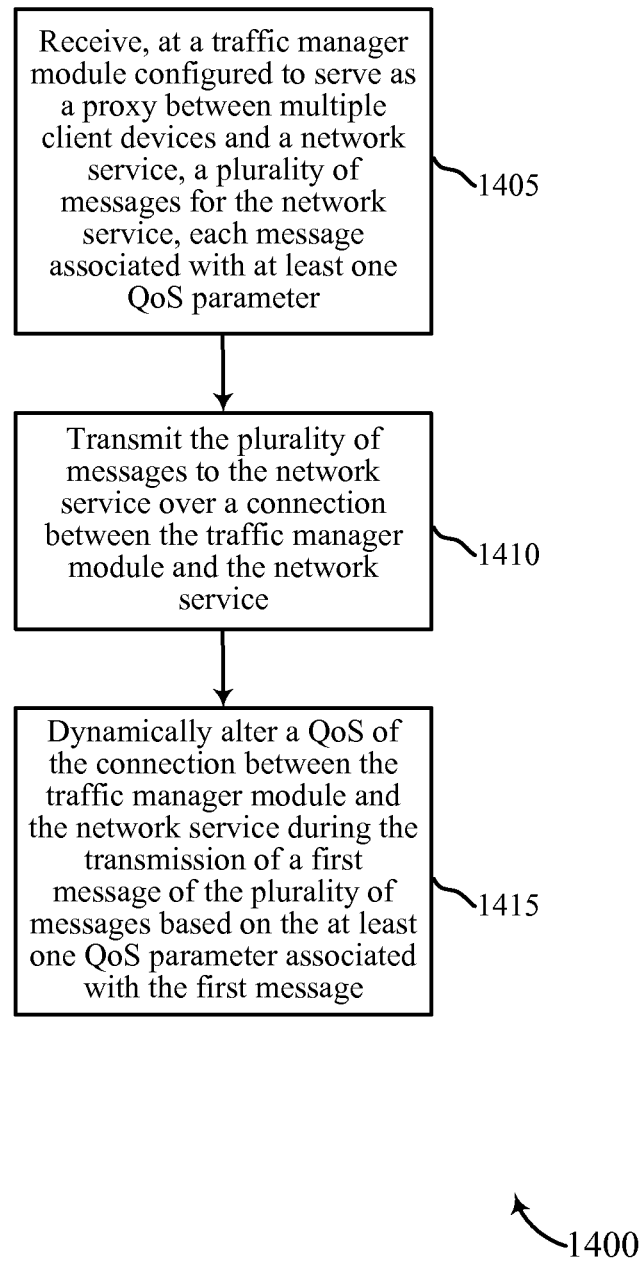
FIG. 14 is a flowchart diagram of an example of a method of managing traffic in a traffic manager module of a network according to various embodiments of the invention.

FIG. 14 is a flowchart diagram of another example of a method 1400 of managing traffic in a traffic manager module of a network. One or more of the traffic manager modules 130 described above with reference to the previous Figures may be a means for performing the method 1400 of FIG. 14.

At block 1405, a traffic manager module configured to serve as a proxy between multiple client devices and a network service may receive a plurality of message for the network service. Each message may be associated with at least one QoS parameter. At block 1410, the plurality of message may be transmitted to the network service over a connection between the traffic manager module and the network service. At block 1415, a QoS of the connection between the traffic manager module and the network service may be dynamically altered during the transmission of a first message of the plurality of messages based on the at least one QoS parameter associated with the first message.

Figure 15:
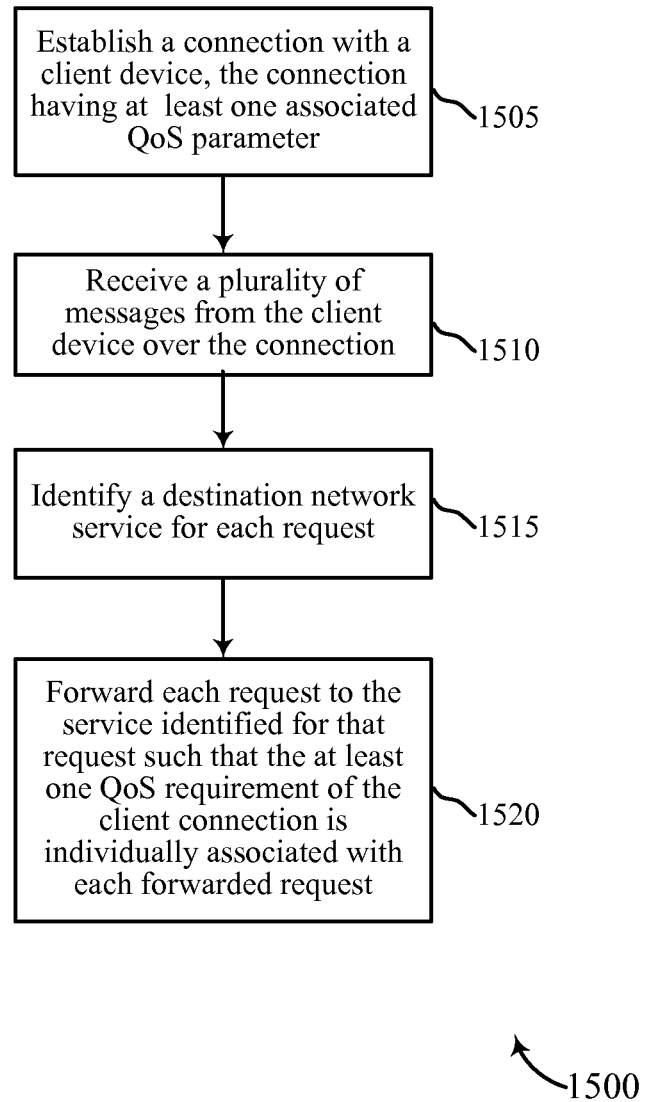
FIG. 15 is a flowchart diagram of an example of a method of managing traffic in a traffic manager module of a network according to various embodiments of the invention.

FIG. 15 is a flowchart diagram of another example of a method 1500 of managing traffic in a traffic manager module of a network. One or more of the traffic manager modules 130 described above with reference to the previous Figures may be a means for performing the method 1500 of FIG. 15. The method 1500 of FIG. 15 may be an example of the method 1400 of FIG. 14.

At block 1505, a connection may be established with a client device, the connection having an associated QoS parameter. At block 1510, a plurality of messages may be received from the client device over the connection. At block 1515, a destination network service may be identified for each message based on the content of the message, the capacity of the network service, or other relevant criteria. At block 1520, each message may be forwarded to the service identified for that message such that each forwarded message is associated with the QoS requirements of the client connection on which that request was received.

SYN Request Caches

Figure 16:
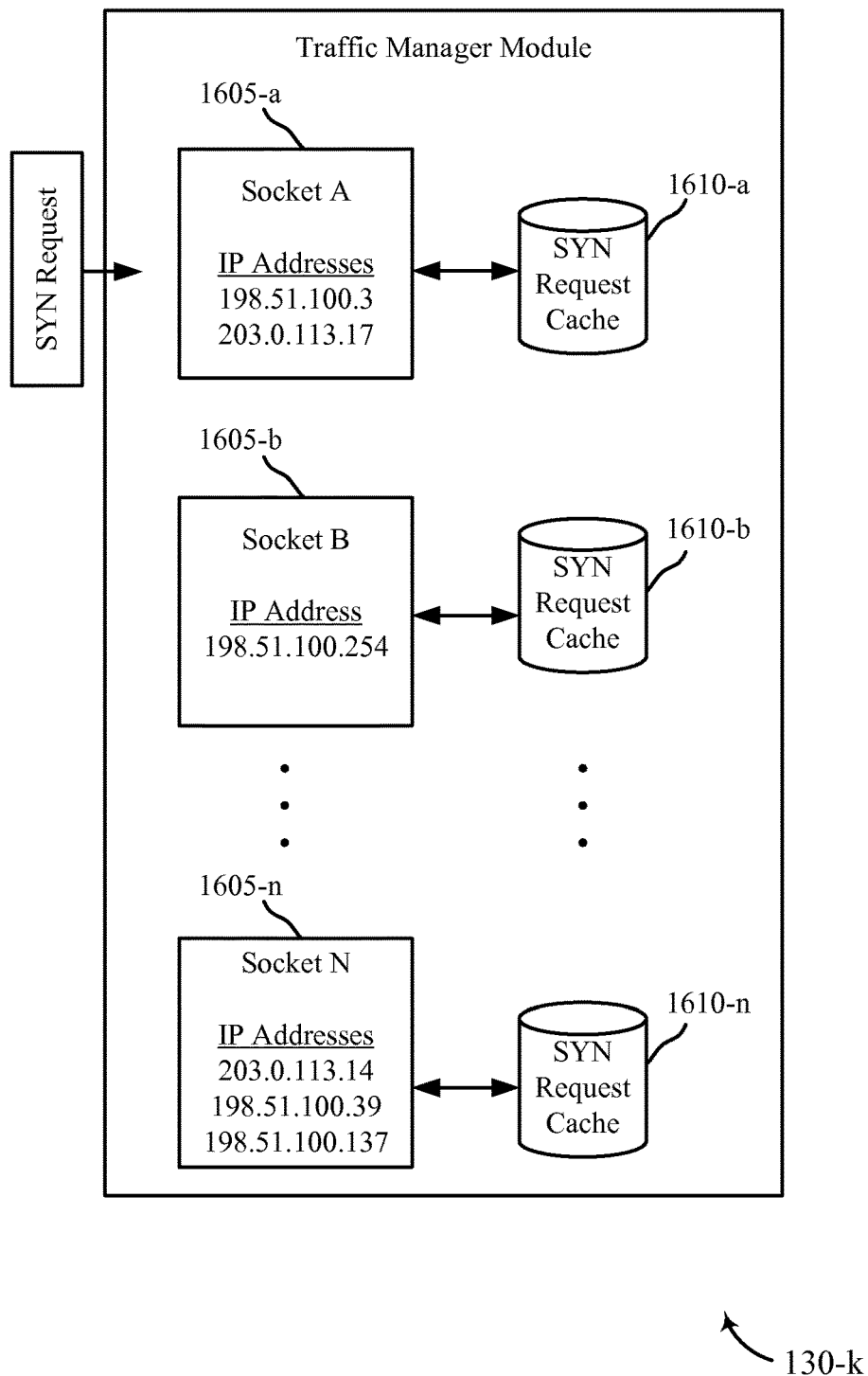
FIG. 16 is a block diagram of an example of a traffic manager module according to various embodiments of the invention.

FIG. 16 is a block diagram of another example of a traffic manager module 130-*k* according to various embodiments of the principles described herein. The traffic manager module 130-*k* may be an example of one or more of the traffic manager modules 130 described above with reference to the previous Figures. The traffic manager module 130-*k* may be able to protect a system 100 against SYN flood attacks or related denial-of-service attacks. As shown in FIG. 16, the traffic manager module 130-*k* may implement a number of TCP or other sockets 1605 to communicate with client devices. In certain examples, each socket 1605 may be associated with one or more virtual Internet Protocol (IP) address. For example, Socket A 1605-*a* is associated with two IP addresses, Socket B 1605-*b* is associated with a single IP address, and Socket N 1605-*n* is associated with three IP addresses.

The three-way handshaking procedure associated with setting up a new TCP connection includes a client device sending a SYN request message to a socket 1605, the socket 1605 responding with a SYN-ACK message to the client device, and the client device responding with an ACK message. In certain examples, one of the IP addresses serviced by the traffic manager module 130-*k* may be the target of a denial of service attack in which a large number of SYN request messages, often from compromised or falsified client devices, are sent to the socket 1605 associated with that IP address. The processing of so many concurrent SYN request messages at one time may slow down or crash the traffic manager module 130-*k*, which may result in collateral service interruptions at the other IP addresses serviced by the traffic manager module 130-*k*.

To address these and other issues, the traffic manager module 130-*k* of FIG. 16 may include a separate SYN request cache 1610 for each socket 1605 or virtual IP address implemented by the traffic manager module 130-*k*. In certain examples, the separate SYN request cache 1610 for each socket 1605 may be implemented as separately allocated portions of a single cache data structure. Alternatively, the separate SYN request cache 1610 for each socket 1605 may be implemented as separate cache data structures for each socket 1605. During normal operation of the traffic manager module 130-*k*, whenever a SYN request message is received at a socket 1605, the SYN request message or a representation of the SYN request message may be stored in the SYN request cache 1610 associated with that socket 1605. When the three-way handshake process for a SYN request completes or times out, that SYN request message may be removed from the SYN request cache 1610. Thus, the SYN request cache 1610 associated with each socket 1605 may include active SYN request messages being processed by the socket 1605.

Once a socket 1605 or virtual IP address implemented by the traffic manager module 130-*k* receives enough concurrent SYN request messages to fill the SYN request cache 1610 associated with that socket 1605, or another measurable status of the SYN request cache 1610 crosses a predetermined threshold, the socket 1605 or virtual IP address may ignore additional SYN request messages until SYN request messages in the cache have been processed and space is again available in the SYN request cache 1610. Thus, if a SYN flood or similar attack is received at one of the sockets 1605, the socket 1605 may stop accepting SYN request messages after the SYN request cache 1610 associated with that socket 1605 is full or another status of the SYN request cache 1610 indicative of load crosses a threshold. In this way, the traffic manager module 130 may prevent a flood of SYN messages from consuming system resources to the point that the system is unresponsive to legitimate traffic. Even if the socket 1605 targeted by the flood of SYN messages is unable to respond to legitimate traffic due to the status of the SYN request cache, the remaining sockets 1605 implemented by the traffic manager module 130-*k* may be unaffected and continue normal operations.

Figure 17:
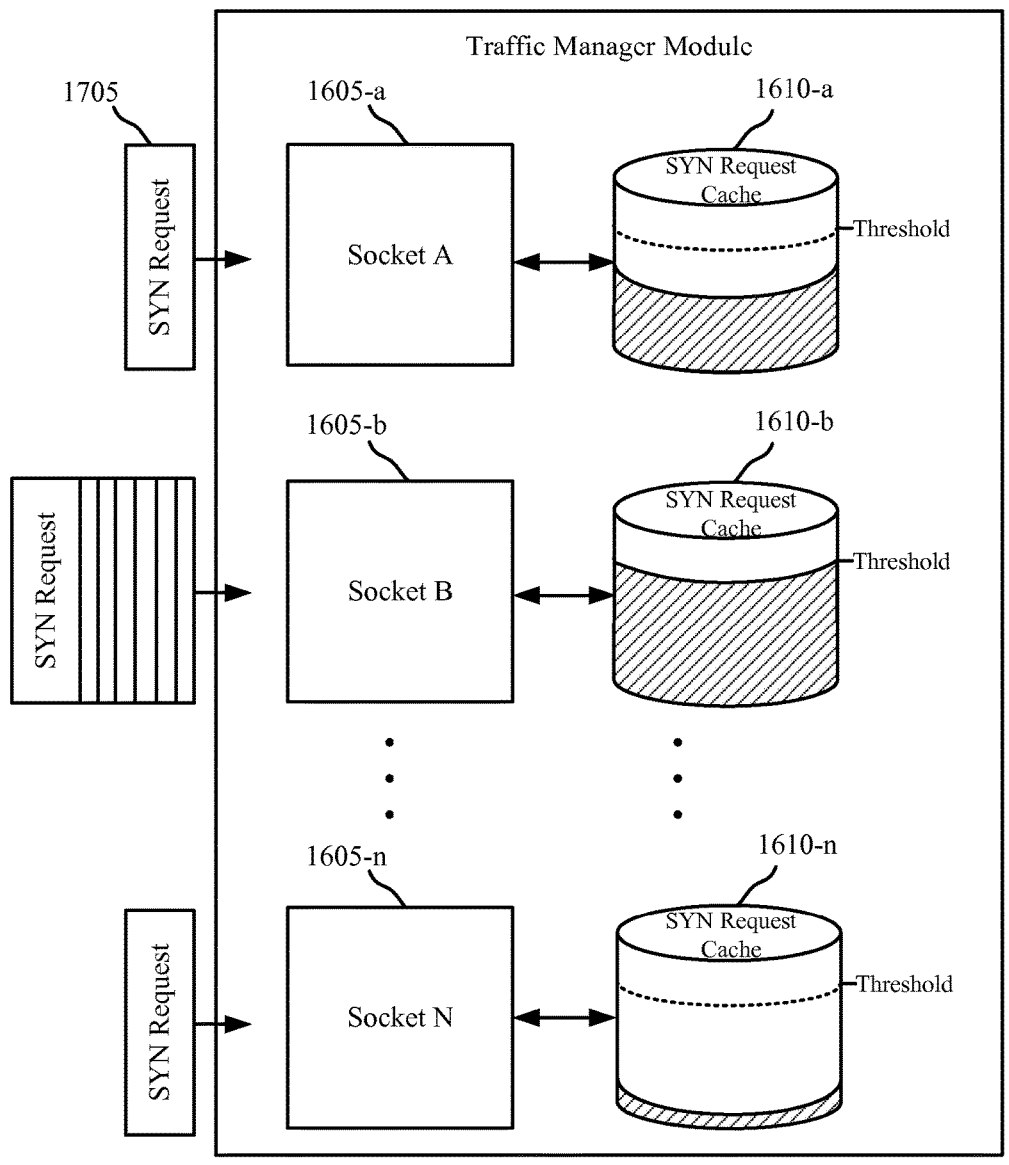
FIG. 17 is a block diagram of an example of a traffic manager module according to various embodiments of the invention.

FIG. 17 is a block diagram of another example of a traffic manager module 130-1 according to various embodiments of the principles described herein. The traffic manager module 130-1 may be an example of one or more of the traffic manager modules 130 described above with reference to the previous Figures. The traffic manager module 130-1 may implement a number of TCP or other sockets 1605 to communicate with client devices. Each socket 1605 may be associated with one or more virtual Internet Protocol (IP) address. Each socket 1605 may be associated with a separate SYN request cache 1110.

As shown in FIG. 17, each SYN request cache 1610 may include a threshold indicating a point at which the associated socket 1605 may begin ignoring additional SYN request messages 1705. In some examples, the threshold may be a measure of the number of active SYN request messages 1705 being processed by the socket 1605. As shown, the number of active SYN request messages 1705 currently being processed by Socket A 1605-*a* and Socket N 1605-*n* (i.e., the amount of memory currently occupied in each associated SYN request cache 1610) is below the indicated threshold. Thus, Socket A 1605-*a* and Socket N 1605-N may continue to accept new SYN request messages 1705. The amount of memory currently used by the SYN request cache 1610-*b* of Socket B 1605-*b*, however, is at the threshold. This condition may be symptomatic of a SYN flood or other malicious event. Consequently, Socket B 1605-*b* may ignore additional SYN request Messages 1705 until the number of active SYN request messages 1705 stored its SYN request cache 1610-*b* is reduced.

The number of active SYN request messages 1705 in the SYN request cache 1610-*b* may be reduced as the Socket B processes the active SYN request Messages 1705. Additionally or alternatively, based on the status of the SYN request cache 1610-*b*, the Socket B may selectively evict a subset of the active SYN request messages 1705 from the SYN request cache 1610-*b*. For example, SYN request messages 1705 that are older than a certain threshold may be evicted from the SYN request cache 1610-*b*. In certain examples, the transmission of SYN-ACK packets for the subset of the active SYN request messages 1705 selected for eviction from the SYN request cache 1610-*b* may be suppressed, and the selected SYN request messages 1705 may be removed from the SYN request cache 1610-*b* as they time out. Once the number of active SYN request messages 1705 has dropped below the threshold, Socket B 1605-*b* may resume accepting SYN request messages 1705 based on the updated status of the SYN request cache 1610-*b*.

Figure 18:
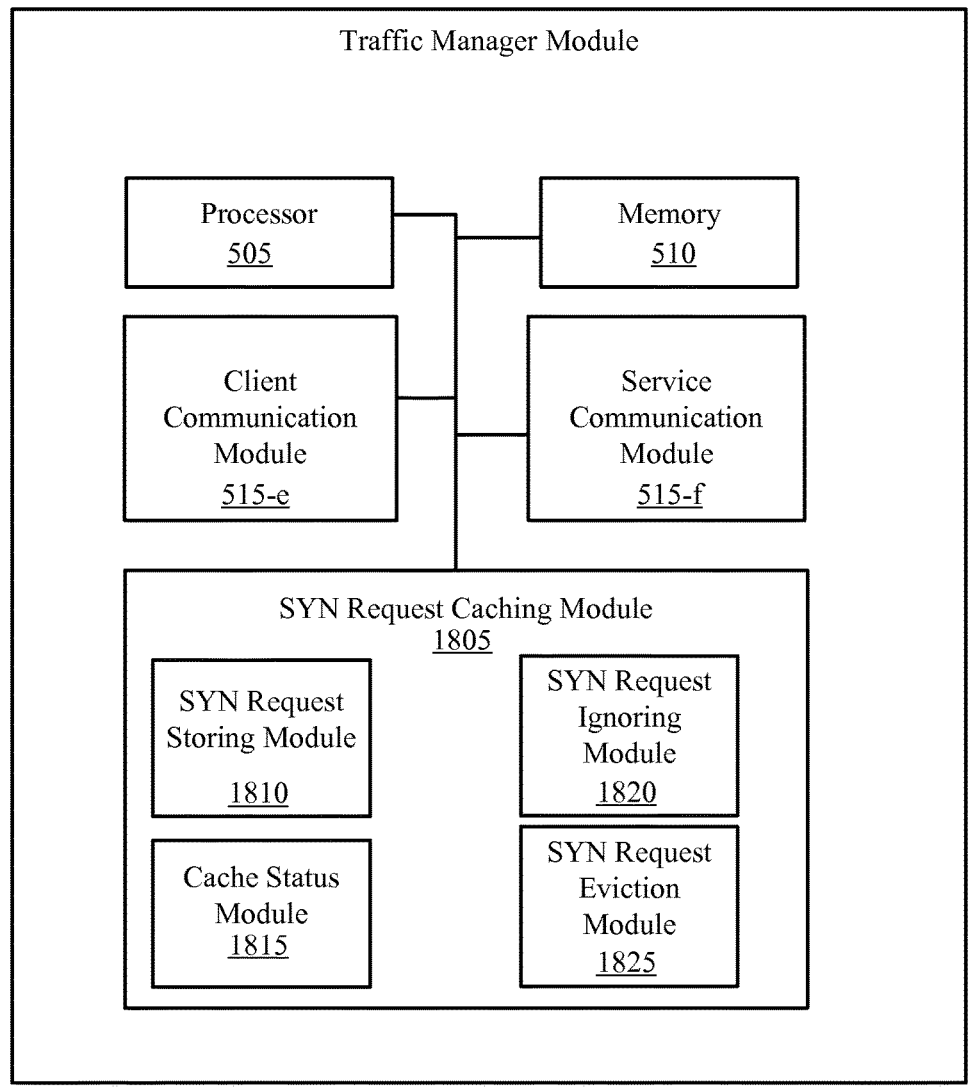
FIG. 18 is a block diagram of an example of a traffic manager module according to various embodiments of the invention.

FIG. 18 is a block diagram of another example of a traffic manager module 130-*m*. The traffic manager module 130-*m* may be an example of one or more of the traffic manager modules 130 described in previous Figures. The traffic manager module 130-*m* may include a processor 505, a memory 510, a client communication module 515-*e*, a service communication module 515-*f*, and a SYN request caching module 1805. Each of these components may be in communication with one another, directly or indirectly.

In certain examples, the processor 505 may be configured to execute computer-readable code stored on the memory 510 to implement one or more of the functions of the client communication module 515-*e*, the service communication module 515-*f*, and/or the SYN request caching module 1805. Thus, the processor 505, when specially programmed according to the computer-readable code stored on the memory 510, may be a means for performing the functionality of the client communication module 515-*e*, the service communication module 515-*f*, and/or the SYN request caching module 1805.

The client communication module 515-*e* may be configured to establish a connection with one or more client devices, and the service communication module 515-*f* may be configured to establish a connection to at least one network service on behalf of the client devices. The traffic manager module 130-*m* may serve as a proxy to at least one network service for at least one client device.

The SYN request caching module 1805 may be configured to maintain a SYN request cache for a socket implemented by the traffic manager module 130-*m*. The SYN request caching module 1805 may include a SYN request storing module 1810 configured to store active SYN request messages at the socket in the SYN request cache. The SYN request caching module 1805 may further include a cache status module 1815 configured to determine a status of the SYN request cache. In certain examples, determining the status of the SYN request cache may include determining that the SYN request cache is full.

The SYN request caching module 1805 may further include a SYN request ignoring module 1820 configured to ignore additional SYN request messages at the socket based on the determined status of the SYN request cache.

In certain examples, the SYN request ignoring module 1820 may be further configured to continue accepting SYN request messages on a second one of the sockets based on a determined status of the SYN request cache for the second one of the sockets while ignoring the additional SYN request messages on a first one of the sockets based on the determined status of the SYN request cache for the first one of the sockets.

In certain examples, the SYN request ignoring module 1820 may be further configured to suppress a transmission of SYN-ACK for a subset of the active SYN request messages in the SYN cache based on the status of the SYN request cache. In this way, the selected subset of SYN request messages may time out and be removed from the SYN request cache.

In certain examples, a SYN request eviction module 1825 may evict a subset of the active SYN request messages from the SYN cache in response to determining the status of the SYN request cache. For example, if the SYN request cache is full, the SYN request eviction module 1825 may select a subset of the active SYN request messages for eviction from the SYN cache based on an age of each one of the active SYN request messages in the SYN request cache (e.g., selecting the n oldest SYN request messages in the cache, where n is a positive integer).

In certain examples, the cache status module 1815 may be configured to determine an updated status of the SYN request cache in response to servicing at least one of the active SYN request messages. For example, the cache status module 1815 may determine that the SYN request cache is no longer full. Acceptance of SYN request message may resume at the socket based on the updated status of the SYN request cache.

Figure 19:
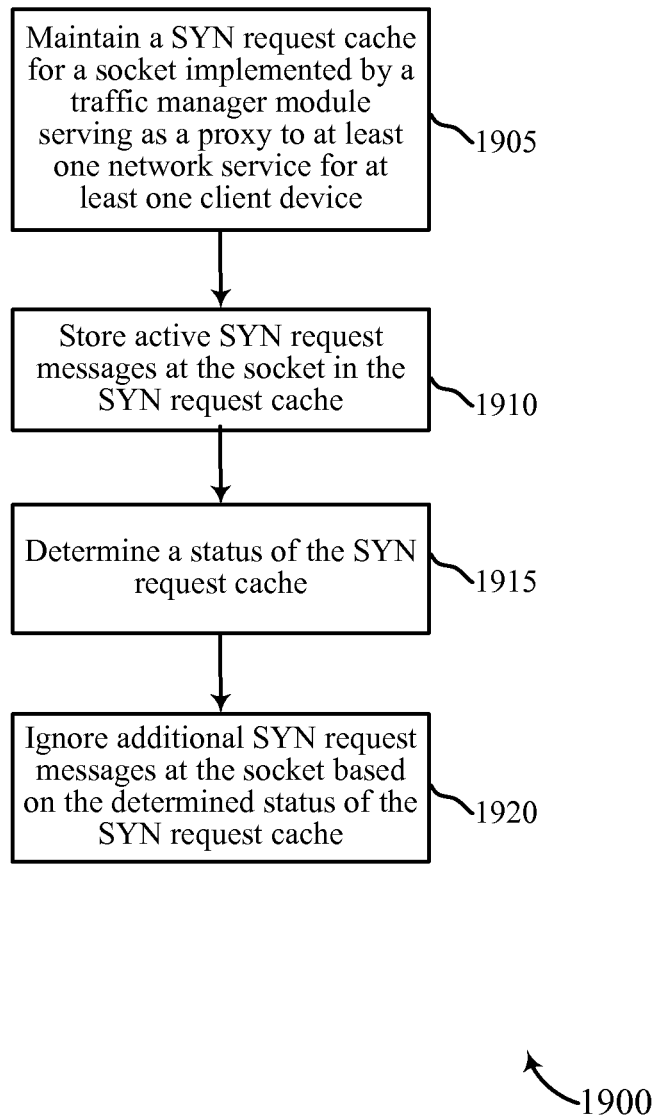
FIG. 19 is a flowchart diagram of an example method of managing traffic in a traffic manager module of a network according to various embodiments of the invention.

FIG. 19 is a flowchart diagram of another example of a method 1900 of managing traffic in a traffic manager module of a network. One or more of the traffic manager modules 130 described above with reference to the previous Figures may be a means for performing the method 1900 of FIG. 19.

At block 1905, a SYN request cache is maintained for a socket implemented by a traffic manager module serving as a proxy to at least one network service for at least one client device. At block 1910, active SYN request messages at the socket may be stored in the SYN request cache. At block 1915, a status of the SYN request cache may be determined. At block 1920, additional SYN request messages at the socket may be ignored based on the determined status of the SYN request cache.

Figure 20:
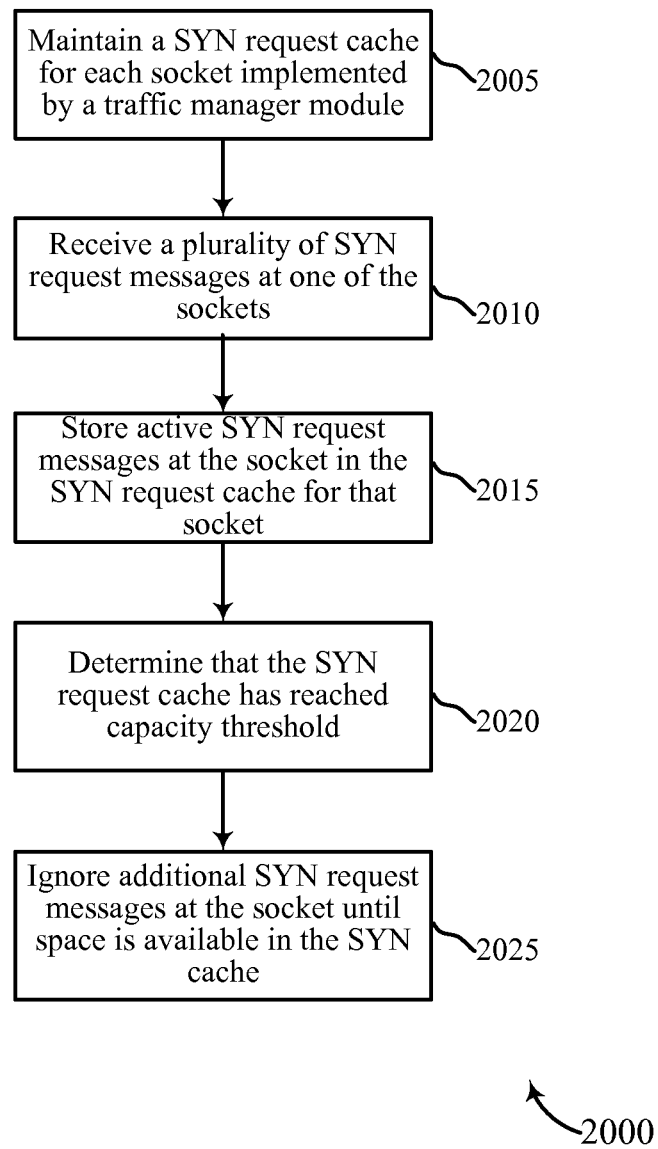
FIG. 20 is a flowchart diagram of an example method of managing traffic in a traffic manager module of a network according to various embodiments of the invention.

FIG. 20 is a flowchart diagram of another example of a method 2000 of managing traffic in a traffic manager module of a network. One or more of the traffic manager modules 130 described above with reference to the previous Figures may be a means for performing the method 2000 of FIG. 20. The method 2000 of FIG. 20 may be an example of the method 1900 of FIG. 19.

At block 2005, a traffic manager module may maintain a SYN request cache for each socket implemented by the traffic manager module. Each SYN request cache may define a capacity threshold. At block 2010, a number of SYN request messages may be received at one of the sockets. At block 2015, active SYN request messages may be stored in the SYN request cache for the socket. At block 2020, it may be determined that the SYN request cache for the socket has reached the capacity threshold. At block 2025, additional incoming SYN request messages may be ignored by the socket until space is available in the SYN request cache.

Figure 21:
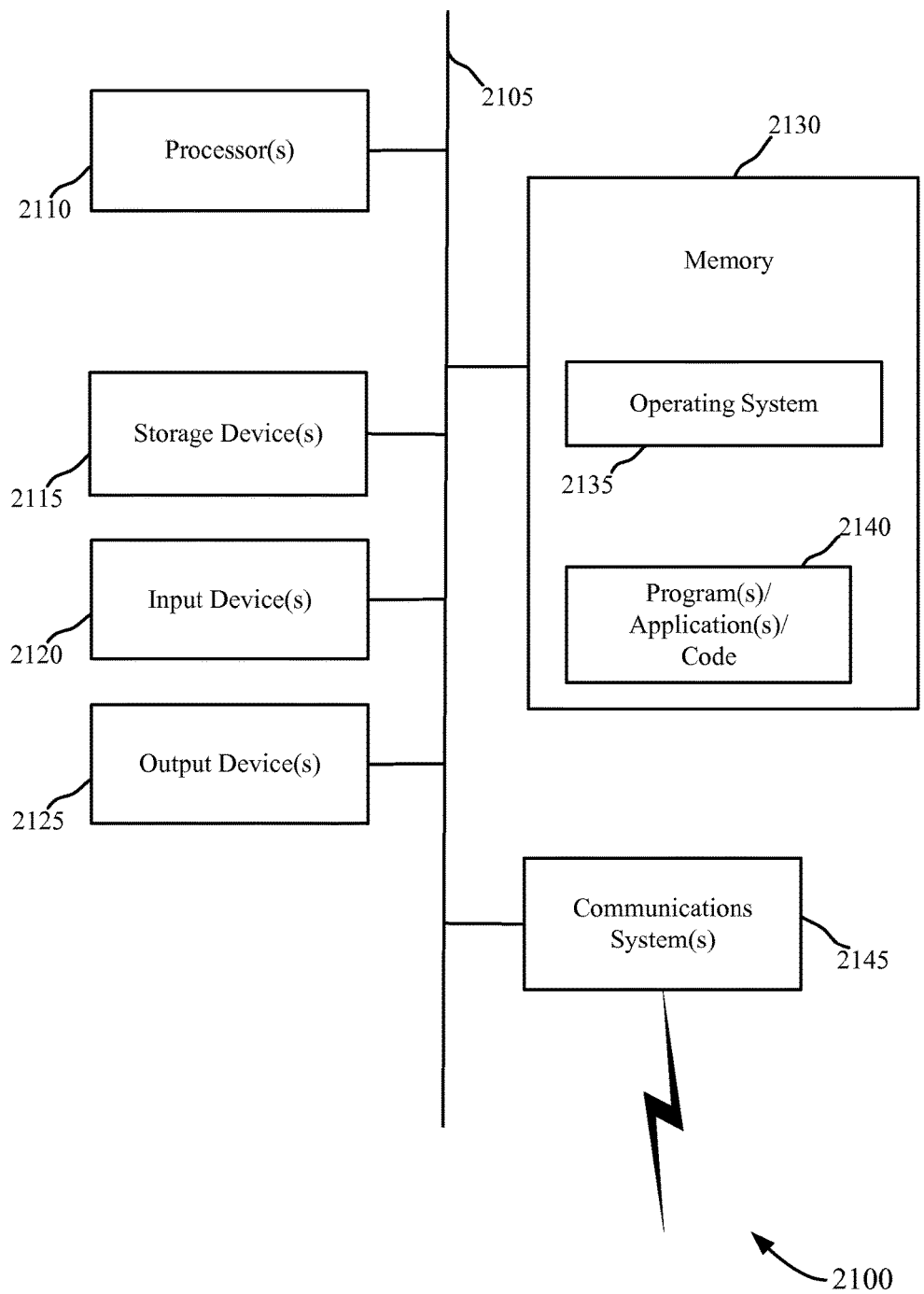
FIG. 21 is a schematic diagram that illustrates a representative device structure that may be used in various embodiments of the present invention.

A device structure 2100 that may be used for a traffic manager module 130, a first network device or client device 105, a second network device or network service 145, a third network device or optimization service 135, or other computer-based devices described herein, is illustrated with the schematic diagram of FIG. 21. This drawing broadly illustrates how individual system elements of each of the aforementioned devices may be implemented, whether in a separated or more integrated manner. The exemplary structure is shown comprised of hardware elements that are electrically coupled via bus 2105, including processor(s) 2110 (which may further comprise a digital signal processing (DSP) or special-purpose processor), storage device(s) 2115, input device(s) 2120, and output device(s) 2125. The storage device(s) 2115 may be a machine-readable storage media reader connected to any machine-readable storage medium, the combination comprehensively representing remote, local, fixed, or removable storage devices or storage media for temporarily or more permanently containing computer-readable information. The communications systems interface 2145 may interface to a wired, wireless, or other type of interfacing connection that permits data to be exchanged with other devices. The communications system(s) interface 2145 may permit data to be exchanged with a network.

The structure 2100 may also include additional software elements, shown as being currently located within working memory 2130, including an operating system 2135 and other code 2140, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

The components described in the present disclosure may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a SIM card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of managing network communications, comprising:
   receiving, at a traffic manager module configured to serve as a proxy between a plurality of client devices and a network service, a plurality of client-side messages for the network service over at least one client-side connection;
   determining a quality of service level for at least one client-side message of the plurality of client-side messages based on a characteristic of one or more of a packet, a message, or a client-side connection associated with the at least one client-side message;
   generating one or more of a plurality of server-side messages corresponding to the at least one client-side message that includes a QoS parameter indicating the quality of service level determined for the at least one client-side message, wherein the one or more server-side messages communicate one or more requests contained in the at least one corresponding client-side message on behalf of the client devices via the proxy;
   transmitting the plurality of server-side messages to the network service over a proxy-side connection between the traffic manager module and the network service; and
   dynamically altering, by the traffic manager module, a QoS setting for the proxy-side connection between the traffic manager module and the network service during a transmission of a first server-side message of the plurality of server-side messages based on a QoS parameter associated with the first server-side message, wherein the first server-side message corresponds to the at least one client-side message, wherein a dynamically altered QoS setting is different than a QoS setting used for the proxy-side connection when a previously transmitted server-side message corresponding to another previously received client-side message was transmitted and wherein one or more subsequent first server-side messages transmitted over the proxy-side connection will have a QoS parameter associated with the dynamically altered QoS setting at least until a new QoS parameter is encountered.

2. The method of claim 1, wherein determining the quality of service level for the at least one client-side message further comprises:
   identifying at least one QoS parameter associated with the client-side message, wherein the at least one QoS parameter comprises one or more of a Type of Service (ToS) parameter, a differentiated services codepoint (DSCP) parameter or any other QoS related parameter.

3. The method of claim 2, wherein generating one or more of a plurality of server-side messages further comprises:
   creating a first set of one or more packets at the traffic manager module, the first set of one or more packets comprising the client-side message.

4. The method of claim 3, wherein dynamically altering the QoS setting for the proxy-side connection between the traffic manager module and the network service comprises:
   setting at least one ToS parameter of the first set of one or more packets based on the at least one QoS parameter associated with the client-side message; and transmitting the first set of one or more packets to the network service over the proxy-side connection between the traffic manager module and the network service.

5. The method of claim 4, wherein:
the at least one QoS parameter associated with the client-side message is determined based on a plurality of DSCP bits associated with the DSCP parameter of the client-side message; and
the setting the at least one ToS parameter of the first set of one or more packets comprises matching a plurality of DSCP bits of the first set of one or more packets to the plurality of DSCP bits associated with the DSCP parameter of the client-side message.

6. The method of claim 3, further comprising:
receiving, at the traffic manager module, a second set of one or more packets comprising a response from the network service to the client-side message; and
determining, from the second set of one or more packets, at least one QoS parameter associated with the response from the network service to the client-side message.

7. The method of claim 6, further comprising:
creating a third set of one or more packets at the traffic manager module, the third set of one or more packets comprising the response from the network service to the client-side message.

8. The method of claim 7, further comprising:
setting at least one ToS parameter of the third set of one or more packets based on the at least one QoS parameter associated with the response from the network service to the client-side message; and
transmitting the third set of one or more packets to the network service over the proxy-side connection between the traffic manager module and the network service.

9. The method of claim 8, wherein:
the at least one QoS parameter associated with the response from the network service to the client-side message is determined based on a plurality of DSCP bits of the second set of one or more packets; and
the setting the at least one ToS parameter of the third set of one or more packets comprises matching a plurality of DSCP bits of the third set of one or more packets to the plurality of DSCP bits of the second set of one or more packets.

10. A traffic manager module, comprising:
at least one processor; and
a memory communicably coupled with the at least one processor, the memory configured to store code that, when executed by the at least one processor, causes the at least one processor to:
receive a plurality of client-side messages for a network service over at least one client-side connection wherein the traffic manager module serves as a proxy between a plurality of client devices and the network service;
determine a quality of service level for at least one client-side message of the plurality of client-side messages based on a characteristic of one or more of a packet, a message, or a client-side connection associated with the at least one client-side message;
generate one or more of a plurality of server-side messages corresponding to the at least one client-side message that includes a QoS parameter indicating the quality of service level determined for the at least one client-side message, wherein the one or more server-side messages communicate one or more requests contained in the at least one corresponding client-side message on behalf of the client devices via the proxy;
transmit the plurality of server-side messages to the network service over a proxy-side connection between the traffic manager module and the network service; and
dynamically alter a QoS setting for the proxy-side connection between the traffic manager module and the network service during a transmission of a first server-side message of the plurality of server-side messages based on a QoS parameter associated with the first server-side message, wherein the first server-side message corresponds to the at least one client-side message, wherein a dynamically altered QoS setting is different than a QoS setting used for the proxy-side connection when a previously transmitted server-side message corresponding to another previously received client-side message was transmitted and wherein one or more subsequent first server-side messages transmitted over the proxy-side connection will have a QoS parameter associated with the dynamically altered QoS setting at least until a new QoS parameter is encountered.

11. The traffic manager module of claim 10, wherein the code further causes the at least one processor to:
identify at least one QoS parameter associated with the client-side message, wherein the at least one QoS parameter comprises one or more of a Type of Service (ToS) parameter, a differentiated services codepoint (DSCP) parameter or any other QoS related parameter.

12. The traffic manager module of claim 11, wherein the code further causes the at least one processor to:
create a first set of one or more packets at the traffic manager module, the first set of one or more packets comprising the client-side message.

13. The traffic manager module of claim 12, wherein the code further causes the at least one processor to dynamically alter the QoS setting for the proxy-side connection between the traffic manager module and the network service by:
setting at least one ToS parameter of the first set of one or more packets based on the at least one QoS parameter associated with the client-side message; and
transmitting the first set of one or more packets to the network service over the proxy-side connection between the traffic manager module and the network service.

14. The traffic manager module of claim 13, wherein:
the at least one QoS parameter associated with the client-side message is determined based on a plurality of DSCP bits associated with the DSCP parameter of the client-side message; and
the code further causes the at least one processor to set the at least one ToS parameter of the first set of one or more packets by matching a plurality of DSCP bits of the first set of one or more packets to the plurality of DSCP bits associated with the DSCP parameter of the client-side message.

15. The traffic manager module of claim 12, wherein the code further causes the at least one processor to:
receive, at the traffic manager module, a second set of one or more packets comprising a response from the network service to the client-side message; and
determine, from the second set of one or more packets, at least one QoS parameter associated with the response from the network service to the client-side message.

16. The traffic manager module of claim 15, wherein the code further causes the at least one processor to:

create a third set of one or more packets at the traffic manager module, the third set of one or more packets comprising the response from the network service to the client-side message.

17. The traffic manager module of claim 16, wherein the code further causes the at least one processor to:
set at least one ToS parameter of the third set of one or more packets based on the at least one QoS parameter associated with the response from the network service to the client-side message; and
transmit the third set of one or more packets to the network service over the proxy-side connection between the traffic manager module and the network service.

18. The traffic manager module of claim 17, wherein:
the at least one QoS parameter associated with the response from the network service to the client-side message is determined based on a plurality of DSCP bits of the second set of one or more packets; and
the code further causes the at least one processor to set the at least one ToS parameter of the third set of one or more packets by matching a plurality of DSCP bits of the third set of one or more packets to the plurality of DSCP bits of the second set of one or more packets.

19. A non-transitory computer-readable medium comprising computer-readable program code stored thereon, which is configured to cause at least one processor to:
receive, at a traffic manager module configured to serve as a proxy between a plurality of client devices and a network service, a plurality of client-side messages for the network service over at least one client-side connection;
determine a quality of service level for at least one client-side message of the plurality of client-side messages based on a characteristic of one or more of a packet, a message, or a client-side connection associated with the at least one client-side message;
generate one or more of a plurality of server-side messages corresponding to the at least one client-side message that includes a QoS parameter indicating the quality of service level determined for the at least one client-side message, wherein the one or more server-side messages communicate one or more requests contained in the at least one corresponding client-side message on behalf of the client devices via the proxy;
transmit the plurality of server-side messages to the network service over a proxy-side connection between the traffic manager module and the network service; and
dynamically alter, by the traffic manager module, a QoS setting for the proxy-side connection between the traffic manager module and the network service during a transmission of a first server-side message of the plurality of server-side messages based on a QoS parameter associated with the first server-side message, wherein the first server-side message corresponds to the at least one client-side message, wherein a dynamically altered QoS setting is different than a QoS setting used for the proxy-side connection when a previously transmitted server-side message corresponding to another previously received client-side message was transmitted and wherein one or more subsequent first server-side messages transmitted over the proxy-side connection will have a QoS parameter associated with the dynamically altered QoS setting at least until a new QoS parameter is encountered.

20. The non-transitory computer-readable medium of claim 19, wherein the computer-readable program code is further configured to cause the at least one processor to:
identify at least one QoS parameter associated with the client-side message, wherein the at least one QoS parameter comprises one or more of a Type of Service (ToS) parameter, a differentiated services codepoint (DSCP) parameter or any other QoS related parameter.

* * * * *